(12) United States Patent
Song et al.

(10) Patent No.: US 11,442,274 B2
(45) Date of Patent: Sep. 13, 2022

(54) ELECTRONIC DEVICE AND METHOD FOR DISPLAYING OBJECT ASSOCIATED WITH EXTERNAL ELECTRONIC DEVICE ON BASIS OF POSITION AND MOVEMENT OF EXTERNAL ELECTRONIC DEVICE

(71) Applicant: Samsung Electronics Co., Ltd., Suwon-si (KR)

(72) Inventors: Hyunji Song, Suwon-si (KR); Wootaek Song, Suwon-si (KR); Taekyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/059,374

(22) PCT Filed: Mar. 22, 2019

(86) PCT No.: PCT/KR2019/003336
§ 371 (c)(1),
(2) Date: Nov. 27, 2020

(87) PCT Pub. No.: WO2019/231090
PCT Pub. Date: Dec. 5, 2019

(65) Prior Publication Data
US 2021/0239983 A1 Aug. 5, 2021

(30) Foreign Application Priority Data
May 29, 2018 (KR) .......................... 10-2018-0061384

(51) Int. Cl.
*G02B 27/01* (2006.01)
*G06F 3/0346* (2013.01)
(Continued)

(52) U.S. Cl.
CPC ....... *G02B 27/0172* (2013.01); *G06F 3/0346* (2013.01); *A63F 13/21* (2014.09);
(Continued)

(58) Field of Classification Search
CPC ........ G02B 27/0172; G02B 2027/0138; G06F 3/0346; G06F 3/012; G06F 3/011;
(Continued)

(56) References Cited

U.S. PATENT DOCUMENTS

2014/0361956 A1 12/2014 Mikhailov et al.
2016/0140930 A1* 5/2016 Pusch ................ G02B 27/0172
345/633
(Continued)

FOREIGN PATENT DOCUMENTS

JP 5-143270 A 6/1993
JP 2018-029907 A 3/2018
(Continued)

OTHER PUBLICATIONS

Supplementary European Search Report dated Jun. 11, 2021, in connection with European Patent Application 19810932.4, 8 pages.
(Continued)

*Primary Examiner* — Brent D Castiaux

(57) ABSTRACT

An electronic device according to various embodiments of the present disclosure includes one or more cameras having a designated field of view, a display, a communication circuitry and a processor wherein the processor is configured to identify an external electronic device among one or more external objects included in the designated field of view using the camera, display a graphic object corresponding to the external electronic device on the display based on first location information of the external electronic device identified based at least on the image information obtained using the camera, and when the external electronic device is out of
(Continued)

the designated field of view, display the graphic object on the display based on second location information of the external electronic device identified using the camera before the external electronic device is out of the designated field of view and information related to the movement of the external electronic device received from the external electronic via the communication circuitry after the external electronic device is out of the designated field of view.

20 Claims, 13 Drawing Sheets

(51) Int. Cl.
    *A63F 13/21*     (2014.01)
    *A63F 13/525*     (2014.01)

(52) U.S. Cl.
    CPC ....... *A63F 13/525* (2014.09); *A63F 2300/105* (2013.01); *A63F 2300/1093* (2013.01); *A63F 2300/8082* (2013.01); *G02B 2027/0138* (2013.01)

(58) Field of Classification Search
    CPC ........ G06F 3/038; G06F 3/0481; G06F 3/005; G06F 3/04815; A63F 13/21; A63F 13/525; A63F 13/211; A63F 13/213; A63F 13/53; A63F 13/537; A63F 13/98; A63F 2300/105; A63F 2300/1093; A63F 2300/8082; G06K 9/46; G06K 9/4661; G06T 19/00; G06T 19/003; G06V 10/40; G06V 10/60

See application file for complete search history.

(56) References Cited

U.S. PATENT DOCUMENTS

| | | | |
|---|---|---|---|
| 2016/0154478 | A1 | 6/2016 | Choi et al. |
| 2017/0252643 | A1* | 9/2017 | Chen ................ A63F 13/235 |
| 2017/0322622 | A1 | 11/2017 | Hong et al. |
| 2017/0337897 | A1 | 11/2017 | Jung et al. |
| 2017/0357332 | A1 | 12/2017 | Balan et al. |
| 2017/0358139 | A1 | 12/2017 | Balan et al. |
| 2018/0061003 | A1 | 3/2018 | Kono et al. |
| 2018/0330521 | A1* | 11/2018 | Samples ............... A63F 13/42 |
| 2020/0030651 | A1 | 1/2020 | Choi |

FOREIGN PATENT DOCUMENTS

| | | |
|---|---|---|
| JP | 2018-036720 A | 3/2018 |
| KR | 10-2016-0063834 A | 6/2016 |
| KR | 10-2017-0023491 A | 3/2017 |
| KR | 10-2017-0090276 A | 8/2017 |
| KR | 10-2017-0126295 A | 11/2017 |
| KR | 10-2018-0043132 A | 4/2018 |

OTHER PUBLICATIONS

International Search Report dated Jul. 3, 2019 in connection with International Patent Application No. PCT/KR2019/003336, 2 pages.

* cited by examiner (A)

(B)

(A)

(B)

ELECTRONIC DEVICE AND METHOD FOR DISPLAYING OBJECT ASSOCIATED WITH EXTERNAL ELECTRONIC DEVICE ON BASIS OF POSITION AND MOVEMENT OF EXTERNAL ELECTRONIC DEVICE

CROSS-REFERENCE TO RELATED APPLICATIONS

This application is a 371 of International Application No. PCT/KR2019/003336 filed on Mar. 22, 2019, which claims priority to Korean Patent Application No. 10-2018-0061384 filed on May 29, 2018, the disclosures of which are herein incorporated by reference in their entirety.

BACKGROUND

1. Field

Various embodiments relate to an electronic device and a method for displaying an object related to an external electronic device using information about the external electronic device.

2. Description of Related Art

Due to the development of technology, various electronic devices for providing services related to virtual reality (VR) have been provided. Various electronic devices include an electronic device for displaying multimedia content related to virtual reality and an external electronic device for user input in the multimedia content related to virtual reality.

A user receiving a service related to virtual reality via an electronic device has a limited field of view (or scope of view). Due to the limitation of the field of view, a separate external electronic device for displaying a user's input in the service related to the VR is provided. In the electronic device, a method for naturally displaying the external electronic device is required.

The technical problems to be achieved in this document are not limited to the technical problems mentioned above, and other technical problems that are not mentioned are clearly understood by those skilled in the art from the following description.

SUMMARY

An electronic device according to various embodiments of the present disclosure includes one or more cameras having a designated field of view, a display, a communication circuitry, and a processor wherein the processor, using the camera, identifies an external electronic device among one or more external objects included in the designated field of view, displays a graphic (visual) object corresponding to the external electronic device on the display based on first location information of the external electronic device identified based at least on image information obtained through the camera, and displays the graphic object on the display, when the external electronic device deviates from the designated field of view, based on second location information of the external electronic device identified through the camera before the external electronic device deviates from the designated field of view and information related to the movement of the external electronic device received from the external electronic device through the communication circuitry after the external electronic device deviates from the designated field of view.

A method according to various embodiments of the present disclosure includes an operation of identifying an external electronic device among one or more external objects included in a designated field of view using one or more cameras having the designated field of view, displaying a graphic object corresponding to the external electronic device through a display based on first location information of the external electronic device identified based at least on image information obtained through the camera, and displaying the graphic object on the display, when the external electronic device deviates from the designated field of view, based on second location information of the external electronic device identified through the camera before the external electronic device deviates from the designated field of view and information related to the movement of the external electronic device received from the external electronic device through the communication circuitry after the external electronic device deviates from the designated field of view.

An electronic device and a method according to various embodiments of the present disclosure provide an enhanced user experience (UX) by displaying a graphic object representing an external electronic device along with multimedia content for providing virtual reality (VR) using at least one of at least one sensor included in the electronic device and at least one sensor of an external electronic device interlocked with the electronic device.

The effects obtainable in the present disclosure are not limited to the above-mentioned effects, and other effects not mentioned are clearly understood by those skilled in the art from the following description.

DETAILED DESCRIPTION

Figure 1:
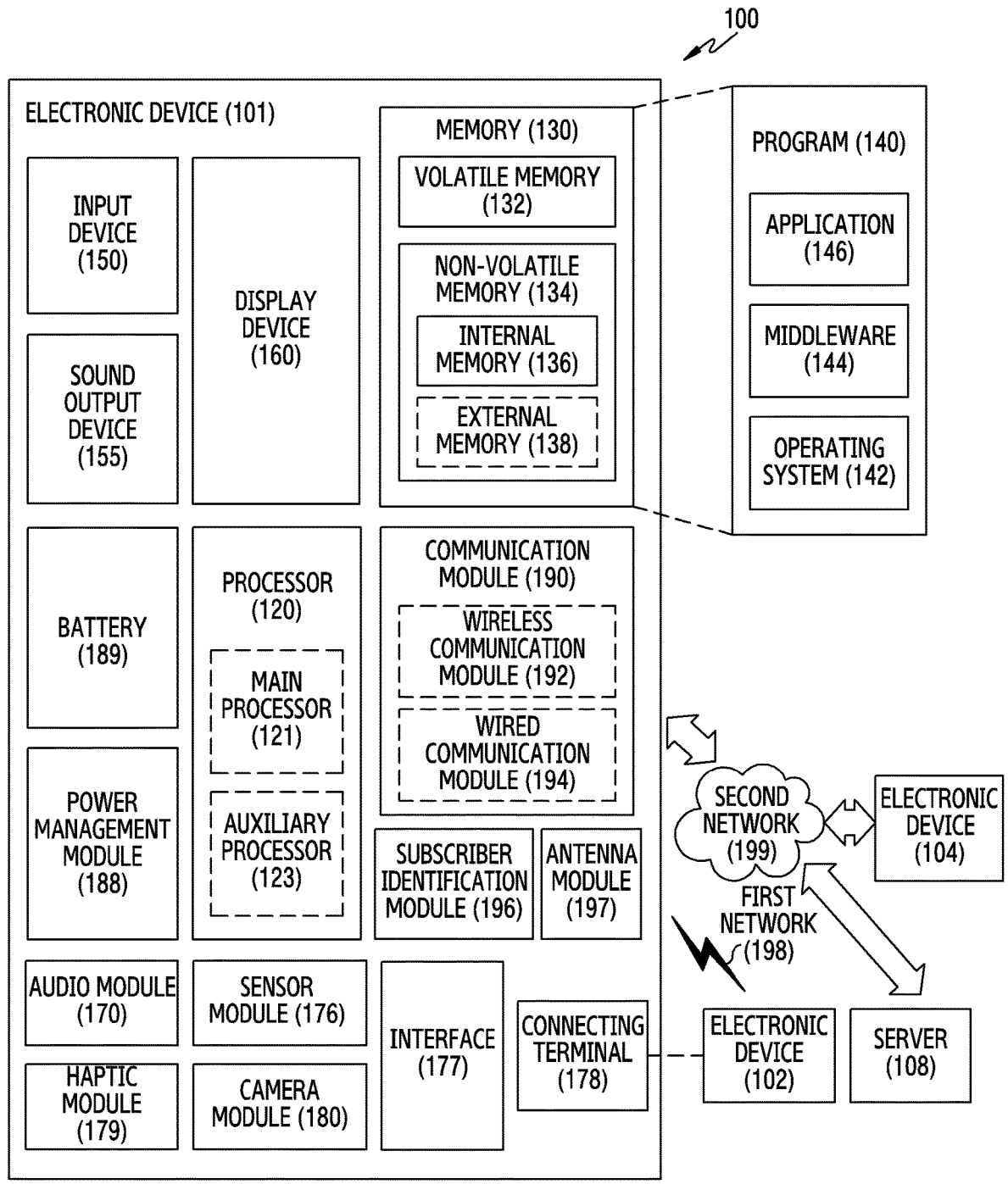
FIG. 1 is a block diagram of an electronic device in a network environment displaying an object related to an external electronic device based on a location and a movement of the external electronic device according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
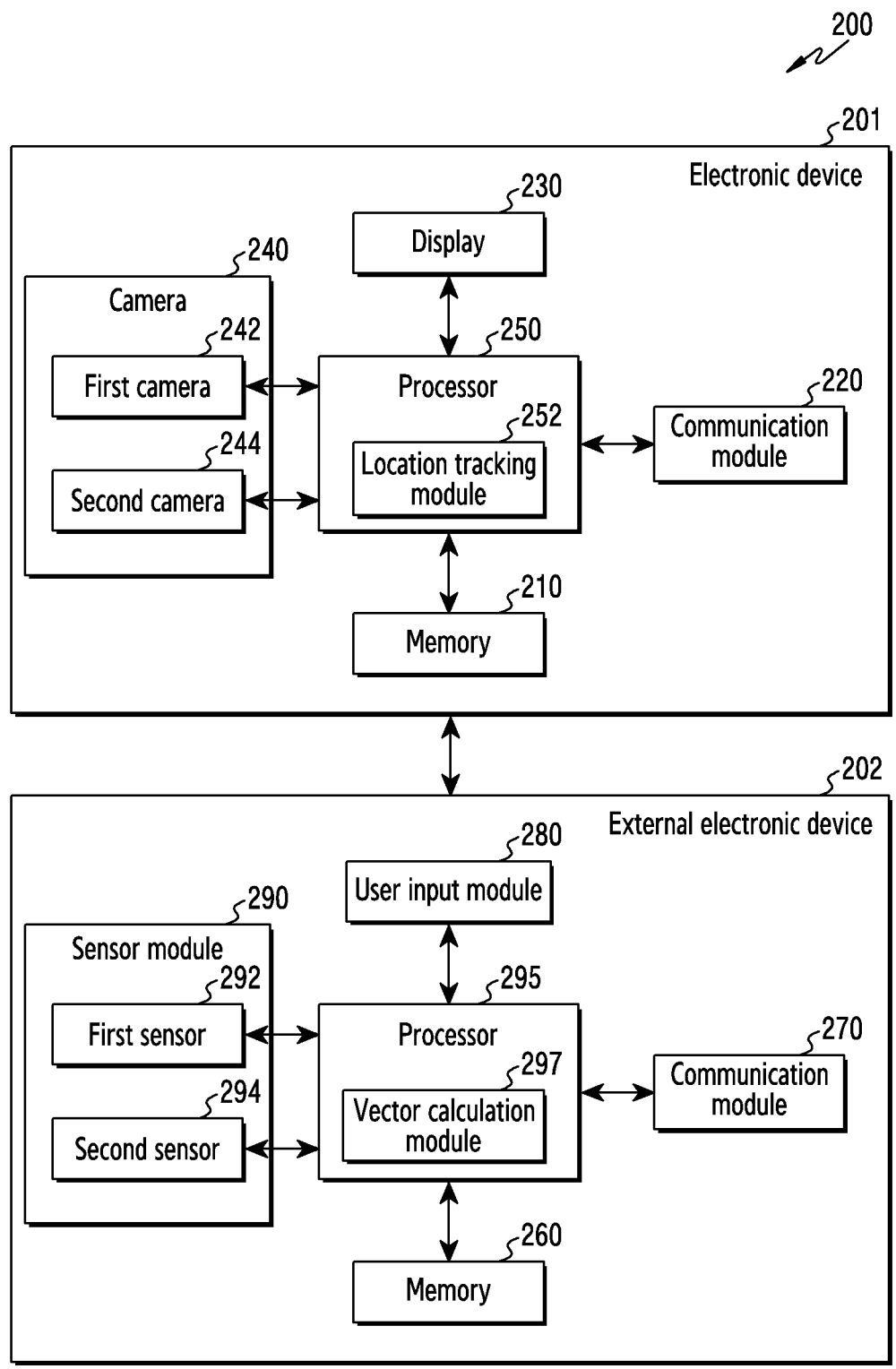
FIG. 2 illustrates an example of a functional configuration of an electronic device and an external electronic device according to various embodiments.

FIG. 2 illustrates an example of a functional configuration of an electronic device and an external electronic device according to various embodiments. At least a part of the functional configuration of an electronic device 201 and an external electronic device 202 in FIG. 2 is included in the functional configuration of the electronic device 101 shown in FIG. 1 and the electronic device 102 shown in FIG. 1.

Referring to FIG. 2, the environment 200 includes the electronic device 201 and the external electronic device 202.

The electronic device 201 is interlocked with the external electronic device 202 and is configured to provide contents related to virtual reality (VR) to the user. The electronic device 201 includes a memory 210, a communication module 220, a display 230, a camera 240, or a processor 250.

In various embodiments, the memory 210 includes the memory 130 shown in FIG. 1, and the communication module 220 includes the communication module 190 shown in FIG. 1, and display 230 includes the display device 160 illustrated in FIG. 1, the camera 240 includes the camera 180 illustrated in FIG. 1, and the processor 250 includes the processor 120 illustrated in FIG. 1.

In various embodiments, the processor 250 (e.g., the processor 120) is operatively or operably coupled with at least one of the memory 210, the communication module 220, and the display 230.

In various embodiments, the processor 250 acquires information about the location of the external electronic device 202 interlocked with the electronic device 201 using the camera 240.

In one embodiment, the processor 250 acquires an image of the external environment of the electronic device 201 using the camera 240. The image of the external environment includes an image related to a plurality of external objects including the external electronic device 202. In one embodiment, the camera 240 is visually exposed through at least a portion of the first surface (the first side) of a housing for mounting the components of the electronic device 201 (e.g., the memory 210, the communication module 220, the display 230, or the processor 250). The housing includes a second surface on an opposite side of the first surface, and the display 230 is visually exposed through at least a portion of the second surface.

Figure 4A:
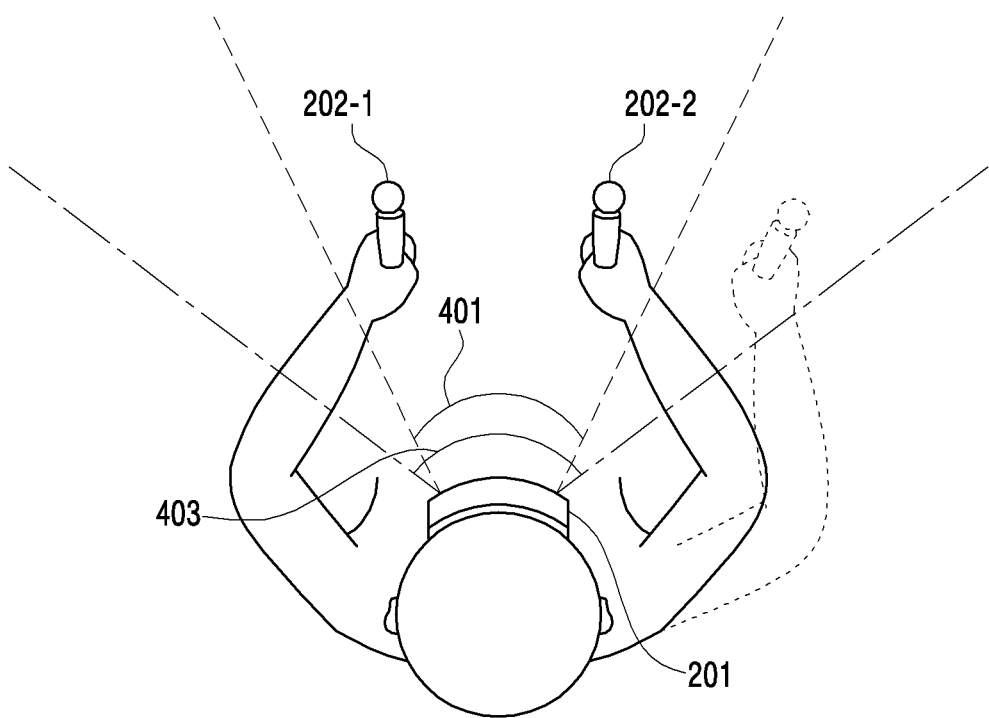
FIG. 4A illustrates an example of a situation in which an external electronic device deviates from a field of view of a camera of an electronic device according to various embodiments.
Figure 4B:
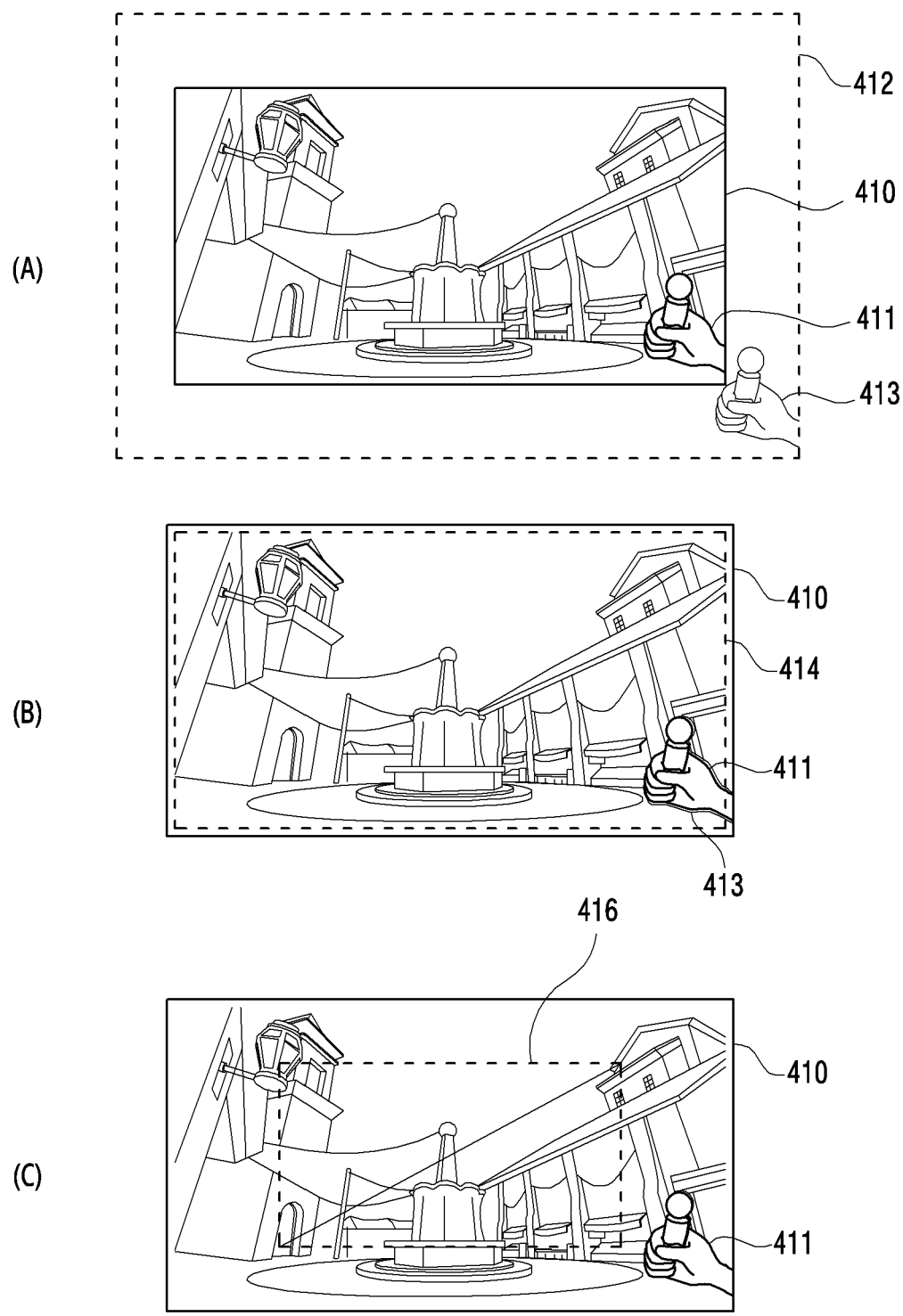
FIG. 4B illustrates an example for comparing a field of view of a camera and a field of view of a user according to various embodiments.

In one embodiment, the camera 240 has a designated field of view. The field of view is referred to as various terms such as a visual field, a viewing angle, an angle of view, FOV (field of view), horizontal FOV (hFOV), and vertical FOV (vFOV). For example, the camera 240 acquires an image corresponding to an area of a predetermined size. The region of the predetermined size includes regions formed by a predetermined angle with respect to the top, bottom, left, and right sides. For example, referring to FIG. 6, an area of the predetermined size corresponds to an area included in the image 610. The user's field of view 401 corresponds to a region of a field of view (FOV) that is displayed on the display. The camera field of view 403 is determined based on the capability of the lenses included in the camera 240. For example, the camera 240 includes a wide angle lens, and the camera field of view 403 has a large value angle corresponding to the wide angle lens. Referring to FIG. 4B, the camera field of view 403 corresponds to the areas 412, 414 and 416 indicated by dotted lines.

In another embodiment, the camera 240 acquires an image for an area of a predefined size. Based on the field of view of the camera 240, the size of the area is different. For example, if the camera 240 corresponds to a wide lens camera, the size of the area increases. For example, referring to FIG. 4B, a camera field of view (FOV) corresponds to a user field of view 401 and corresponds to a field of view 403 larger than the image area 410 displayed on the display.

Hereinafter, the image 410 displayed in the display 230 includes images corresponding to a user's field of view. In various embodiments, the field of view of the camera 240 is the same with the field of view of a displayed area of the image 410 displayed on the display 230. However, the field of view of the camera 240 is not limited thereto, and as illustrated in FIG. 4B, it is smaller or larger than the user's field of view.

In another embodiment, the processor 250 is linked or interlocked with the external electronic device 202. For example, the interlocking includes a connection created by a wired or a wireless way. The interlocking is performed by the communication module 220 included in the electronic device 201.

In another embodiment, the processor 250 detects the external electronic device 202 by detecting a signal output from the external electronic device 202. For example, the external electronic device 202 further includes a light emitting part. The light emitting part includes at least one light emitting diode (LED). For example, the external electronic device 202 outputs a light corresponding to illuminance over or equal to a threshold range (e.g., a threshold value) through the LED. The processor 250 of the electronic device 201 identifies the external electronic device 202 by receiving the light corresponding to illuminance over or equal to the threshold value. In one embodiment, when the processor 250 detects a signal output from the LED of the external electronic device in the image acquired by the camera 240, it is determined that the external electronic device 202 is located within the field of view of the camera 240. For another example, if the processor 250 does not detect a signal output from the LED of the external electronic device in the image acquired by the camera 240, it is determined that the external electronic device 202 is not located within the field of view of the camera 240. That is, when the area corresponding to the illuminance exceeding the threshold value is not detected in the acquired image, the processor 250 determines that the external electronic device 202 deviates from the field of view of the camera 240.

According to an embodiment, the LED included in the external electronic device 202 is turned on or off at predetermined time intervals. The electronic device 201 detects the external electronic device 202 by identifying information on the predetermined time intervals for ON or OFF of the LED included in the external electronic device 202 by recognizing that the external electronic device 202 is turned on or off at predetermined time intervals. For example, the external electronic device 202 controls the LED to repeat ON or OFF every 0.1 seconds. The external electronic device 202 transmits periodic information for providing the predetermined time intervals to the electronic device 201 when the external electronic device 201 controls the LED to be turned on or off at predetermined time intervals. The electronic device 201 receives the period information and obtains information about the predetermined time interval for ON or OFF of the LED included in the external electronic device 202. The electronic device 201 detects the external electronic device 202 by identifying an LED that is turned on or off in the same manner as the predetermined time interval based on the period information. In one embodiment, the predetermined time interval is randomly determined. For example, the predetermined time interval is determined based on the unique ID of the external electronic device 202. Since an ON or OFF time interval is determined based on the unique ID of the external electronic device 202 interlocked with the electronic device 201, even if the electronic device 201 recognizes, through the camera 240, the LED output from another external electronic device (e.g., the VR controller of another user) interlocked with another electronic device, the electronic device 201 accurately identifies the LED output from the external device 202 interlocked with the electronic device 201.

According to an embodiment, the external electronic device 202 measures the brightness of the external environment through an illuminance sensor (not shown) included in the external electronic device 202. When the brightness of the external environment is greater than or equal to a predetermined value, the external electronic device 202 changes the LED output intensity. For example, the external electronic device 202 increases the LED output intensity in response to detecting that the measured brightness for the external environment is greater than a predetermined threshold. The external electronic device 202 is more easily identified by the electronic device 201 by increasing the LED output intensity. The external electronic device 202 turns the LED on or off according to the predetermined time interval based on the increased LED output intensity.

In another embodiment, the electronic device 201 acquires information about the location of the external electronic device 202. The location information includes information determined based on an image obtained from the camera 240 of the external electronic device 202. For example, the location information includes information about coordinates in which the external electronic device 202 is located in the acquired image. The location information includes an x coordinate value, a y coordinate value, or a z coordinate value. Information about the coordinates is obtained by the location tracking module 252 included in the processor 250.

In another embodiment, the processor 250 includes a location tracking module 252. The location tracking module 252 acquires information about the location of the external electronic device 202 included in the image acquired by the camera 240. For example, the location tracking module 252 divides the acquired image into equally spaced coordinated in x-axis and y-axis, and obtains x-coordinates or y-coordinates corresponding to the region in which the external electronic device 202 is detected. However, in various embodiments, the x-axis coordinates and the y-axis coordinates are not limited to be obtained based on the division of the same interval, and is also obtained based on techniques for obtaining information about multiple locations. For another example, the location tracking module 252 acquires depth information based on the acquired image. The depth information is obtained based on an image operation for calculating the depth information from a two-dimensional image. According to another embodiment, the location tracking module 252 acquires depth information based on a difference value for two images. For example, the electronic device 201 includes two cameras, and the two cameras acquire images of the external electronic device 202, respectively. The two cameras are arranged side by side independently with a certain distance. The location tracking module 252 acquires the depth information based on a difference between respective images obtained from the two cameras. The location tracking module 252 obtains a z coordinate value according to the obtained depth information.

In various embodiments, the processor 250 receives information on tilting of the external electronic device 202 from the external electronic device 202. The processor 250 receives information on the tilting via the communication module 220.

According to an embodiment, the tilt information includes information obtained by at least one sensor included in the external electronic device 202. For example, the at least one sensor includes a gyro sensor. The gyro sensor acquires sensor data (hereinafter, first sensor data) for tilting of the external electronic device 202. The first sensor data includes sensor data related to at least one of a pitch, a roll, or a yaw.

According to an embodiment, the tilt information is transmitted from the external electronic device 202 to the electronic device 201. For example, the tilt information is transmitted to the electronic device 201 based on a state change of the external electronic device 202. The external electronic device 202 transmits the tilt information to the electronic device 201 in response to the turn on of power, on status, power on, or activation state of the external electronic device 202. The tilt information is periodically transmitted from the external electronic device 202 to the electronic device 201. In one embodiment, the external electronic device 202 further includes a grip sensor (not shown). The grip sensor is configured to detect that the external electronic device 202 has been gripped by the user. The processor 295 (e.g., the processor 250) receives a signal indicating that the external electronic device 202 has been gripped by the user from the grip sensor, and in response to receiving the indicated signal, the processor 295 activates the gyro sensor. The processor 295 acquires information about the tilt via the activated gyro sensor and transmits it to the electronic device 201.

For another example, the external electronic device 202 transmits information about the tilt to the electronic device 201 in response to receiving a control signal from the electronic device 201. The electronic device 201 detects that interlocking with the external electronic device 202 is completed, and transmits a control signal requesting the external electronic device 202 to transmit information on the tilt in response to the detection. The control signal includes a signal indicating to activate the gyro sensor and/or the acceleration sensor. The external electronic device 202 activates the gyro sensor and acquires the first sensor data in response to the control signal. The external electronic device 202 activates the acceleration sensor and acquires the second sensor data in response to the control signal.

In various embodiments, the processor 250 provides a graphic object (visual object) for representing the external electronic device 202 together with multimedia content related to the virtual reality (VR). The graphic object refers to an object displayed on the display 230 to indicate user input in multimedia content related to virtual reality. The user input includes information about the movement of the external electronic device 202. The graphic object is referred to as various terms such as a visual object, a graphical object, and a controller object. According to an embodiment, the graphic object includes images of various shapes. For example, the graphic object includes an image of the same or similar shape to that of the external electronic device 202. For another example, the external electronic device 202 includes an image determined based on the type of multimedia content. The image determined based on the type of content includes images for various objects including a tennis racket, steering wheel, knife or sword, and the like.

In one embodiment, the processor 250 displays multimedia content related to the virtual reality. The multimedia content includes at least one of a three-dimensional or an omni-directional image for providing a virtual reality service to a user.

In another embodiment, the processor 250 displays the graphic object for representing the external electronic device 202 on the display 230. For example, the graphic object is displayed to be superimposed with the multimedia content related to the VR. The processor 250 renders multimedia content related to the VR at a first time point and renders the graphic object. The graphic object is displayed superimposed on the multimedia content.

In another embodiment, the graphic object is identified based on information on the location of the external electronic device 250 or information on the tilting of the external electronic device 202. For example, the processor 250 obtains information about the location of the external electronic device 202, and identifies a location to display the graphic object. For example, the processor 250 determines to display the graphic object in three dimensions at the identified display location based on the information about the tilting. Since the processor 250 identifies only the location of the external electronic device 202 based on the illuminance value in the image acquired via the camera 240, the tilt information is needed as the information for rendering in three dimensions. For another example, the processor 250 acquires information about the tilt based on a pattern or a marker of the external electronic device 202 included in the image acquired via the camera 240. In one embodiment, the external electronic device 202 includes at least one marker. Since the at least one marker is located in a fixed area of the external electronic device 202, when the external electronic device 202 is tilted, the at least one marker is also tilted in the same way. The processor 250 acquires an image of the at least one tilted marker in an image acquired via the camera 240. In another embodiment, the external electronic device 202 outputs a light of a predetermined pattern through the LED. For example, when the external electronic device 202 is inclined to form a perpendicular angle to the ground surface, the external electronic device 202 turns the LED on or off at 0.1 second intervals. For another example, when the external electronic device 202 is inclined side by side with the ground surface, the external electronic device 202 turns the LED on or off at 0.5 second intervals. The external electronic device 202 indirectly provides information about the tilt of the external electronic device 202 by transmitting the information on the predetermined pattern to the electronic device 201.

In yet another embodiment, the graphic object is determined based on multimedia content related to the VR. The multimedia content related to the VR includes a tennis match, a war game, a car game, and the like. For example, when the multimedia content corresponds to a tennis match, the graphic object corresponds to an image including the shape of a tennis racket. For another example, when the multimedia content corresponds to the war game, the graphic object corresponds to an image including the shape of a sword or a knife. As another example, when the multimedia content corresponds to the car game, the graphic object corresponds to an image including a shape of a steering wheel.

The processor 250 determines a point corresponding to the value of the x-coordinate and/or the y-coordinate on the display 230 by referring to a value of the x-coordinate and/or y-coordinate among the information on the location. The processor 250 determines a size of the determined point by referring to a value for z coordinates among the information on the location. For example, when the value for the z coordinate is large (e.g., the external electronic device 202 is far from the user), the determined point for the perspective effect is displayed small. For another example, when the value for the z coordinate is small (e.g., the external electronic device 202 is located close to the user), the determined point for the perspective effect is largely displayed. The processor 250 determines a three-dimensional display of the graphic object based on the tilt information. For example, the processor 250 determines the tilted direction or angle in three dimensions by referring to the gyro sensor data indicating at least one of a pitch, a roll, or a yaw among the information on the tilt. The processor 250 displays the graphic object inclined according to the tilted direction or angle in 3D at a location determined according to the x coordinate, y coordinate, or z coordinate. For example, referring to FIG. 6, the processor 250 displays the display image 620 via the display 230. The display image 620 includes a background image or the graphic object 602 related to the multimedia content. The processor 250 displays the graphic object 602 on an area corresponding to the location of the external electronic device 102 identified based on the camera image 610. The processor 250 displays the graphic object 602 to have the same tilt based on the information about the tilt of the external electronic device 202 received from the external electronic device 202. The image 620 displayed via the display 230 includes images corresponding to a user's field of view. In various embodiments, the field of view of the camera 240 is the same as the field of view of the display area of the image 620 displayed via the display 230.

In various embodiments, the processor 250 identifies that the external electronic device 202 deviates from the field of view of the camera 240. For example, the processor 250 identifies whether the external electronic device 202 deviates from the field of view of the camera 240 based on an image acquired by the camera 240. The processor 250 determines that the external electronic device 202 has deviated from the field of view of the camera 240 when an area corresponding to illuminance of a threshold value or higher is not detected in the acquired image. As another example, if the processor 250 detects an area corresponding to the illuminance of the threshold value or higher in an image acquired by the camera 240, the processor 250 determines that the external electronic device 202 is inside the field of view of the camera 240. For another example, referring to FIG. 4A, the user grips each of the external electronic devices 202-1 and 202-2 with both hands while wearing the electronic device 201. Each of the external electronic devices 202-1 and 202-2 corresponds to the external electronic device 202 shown in FIG. 2. Referring to FIG. 4A, when a user of the electronic device 201 faces an arm forward (e.g., indicated by a solid line), the external electronic devices 202-1 and 202-2 are within a view of angles (401) of the electronic device 201, and the electronic device 201 acquires an image including external electronic devices 202-1 and 202-2. As the processor 250 detects an area corresponding to the illuminance of a threshold value or higher, which is emitted from the external electronic devices 202-1 and 202-2, and thereby the processor 250 identifies that the external electronic devices 202-1 and 202-2 is located inside the field of view of the electronic device 201. Referring to FIG. 4A, when a user of the electronic device 201 points the arm to the side (e.g., as in the example of an arm indicated by a dotted line), the external electronic devices 202-1 and 202-2 deviates from the viewing angle 401 of electronic devices 201, and the electronic device 201 does not acquire an image including external electronic devices 202-1 and 202-2. The electronic device 201 does not detect an area corresponding to the illuminance above a threshold value or higher, emitted from the external electronic devices 202-1 and 202-2. The electronic device 201 identifies that the external electronic devices 202-1 and 202-2 deviates from field of view of the camera 240 or are out of field of view of the camera 240.

According to an embodiment, the processor 250 stores information on the location of the external electronic device 202 corresponding to the deviation time point. For example, the processor 250 identifies the location of the external electronic device 202 in response to identifying the deviation. The identified location is located on one of the boundary surfaces of the image acquired by the camera 240. The processor 250 stores information on the identified location as second location information. The second location information is obtained by the most recent image including the external electronic device 202 among a plurality of images acquired by the camera 240. When the image obtained by the camera 240 is divided into the x-axis along the horizontal axis and the y-axis along the vertical axis, the second location information includes information about one of the points having only one of the x-coordinate value or the y-coordinate value.

In various embodiments, the processor 250 transmits a request, in response to the above identification, to the external electronic device 202 to transmit information about a change in the location of the external electronic device 202. When the external electronic device 202 deviates from the field of view of the camera 240, the camera 240 does not acquire an image including the external electronic device 202, and accordingly, the processor 250 does not acquire information about the location of the external electronic device 202. Accordingly, when the processor 250 detects the deviation of the external electronic device 202, the processor 250 transmits a request for information about the change in the location of the external electronic device 202 to the external electronic device 202.

In one embodiment, the information about the change in location includes information obtained by at least one sensor of the external electronic device 202. For example, the at least one sensor included in the external electronic device 202 includes a first sensor 292 or a second sensor 294. The first sensor 292 corresponds to a gyro sensor, and the second sensor 294 corresponds to an acceleration sensor. The first sensor 292 acquires information about the tilting of the external electronic device 202, and the second sensor 294 acquires information about the change in speed of the external electronic device 202. The external electronic device 202 transmits information obtained from the first sensor 292 or the second sensor 294 to the electronic device 201 in response to a request for information about the change in the location. That is, the external electronic device 202 transmits only the information on the tilt by the first sensor 292 to the electronic device 201, and in response to the request, the information on the tilt by the first sensor 292 and information on the speed change by the second sensor 294 are transmitted together. The transmitted tilt information or information on the speed change is used by the processor 250 of the electronic device 201 to predict location of the external electronic device 202 at a time point after the deviation of the external electronic device 202.

In another embodiment, the information about the change in location includes data indicating the amount of change in the location of the external electronic device 202. For example, the data indicating the amount of location change includes vector information. Data indicating the amount of location change is obtained by the external electronic device 202. The external electronic device 202 acquires the vector information based on the information obtained by the first sensor 292 or the second sensor 294. The external electronic device 202 transmits the vector information obtained based on the sensor data, instead of transmitting the sensor data acquired by the first sensor 292 or the second sensor 294.

In one embodiment, the processor 295 predicts a moving direction of the external electronic device 202 based on information on the tilt. For example, the processor 295 predicts movement of the external electronic device 202 in a direction corresponding to the rotation direction. This is because, while the user holds the external electronic device 202 by hand, when the data by the gyro sensor is detected, the expected value for the case where the data is detected by the rotational movement in place is very low. Accordingly, when the processor 295 acquires data indicating that the external electronic device 202 has rotated in the x+ direction, the processor 295 predicts that the external electronic device 202 has moved in the x+ direction. For another example, the processor 295 stores information about a change in the location for repetitive operation. In another embodiment, the processor 295 compares data obtained from the first sensor 292 or the second sensor 294 with the stored information. When the obtained data and the stored information match, the processor 295 determines that the user gripping the external electronic device 202 is performing a repetitive operation. The processor 250 displays a graphic object on the display 230 based on the determined repetitive operation.

In another embodiment, a request signal requesting to transmit information about the change in location includes a control signal indicating to activate the second sensor 294 of the external electronic device 202. The external electronic device 202 activates the second sensor 294 in response to receiving the control signal included in the request signal, and obtains information about the speed change. According to an embodiment, when the processor 250 identifies the external electronic device 202 based on the image acquired by the camera 240 (e.g., the external electronic device 202 is within the camera field of view 403), the control signal instructing to activate the first sensor 292 (e.g., a gyro sensor) is transmitted to the external electronic device 202. The processor 250 receives information about a direction and/or angle in which the external electronic device 202 is tilted from the first sensor 292. The processor 250 renders the external electronic device 202 according to the tilted direction and/or angle on the location of the external electronic device 202 in the image acquired by the camera 240. According to another embodiment, when the processor 250 does not identify the external electronic device 202 based on the image acquired by the camera 240 (e.g., deviation of the external electronic device 202 from the camera field of view 403 is detected), control signals instructing to activate both the first sensor 292 (e.g., gyro sensor) and/or the second sensor 294 (e.g., acceleration sensor) are transmitted to the external electronic device 202. The processor 250 receives information on a speed change of the external electronic device 202 outside the camera field of view 403 from the second sensor 294. The processor 250 acquires a location to which the external electronic device 202 is predicted to have moved based on the information on the speed change. The processor 250 receives information on a tilted direction and/or a tilted angle of the external electronic device 202 from the gyro sensor. The processor 250 renders a graphic object corresponding to the external electronic device 202 on a location where the external electronic device 202 is predicted to have moved. The processor 250 displays the graphic object based on the tilted direction and/or the tilted angle.

According to various embodiments, the processor 250 changes a display of the graphic object based at least on information on the location of the external electronic device 202 at a deviation time obtained using the camera 240, information on the tilt of the external electronic device 202 received from the external electronic device 202 or information on a change in the location of the external electronic device 202.

According to an embodiment, the processor 250 predicts the location of the external electronic device 202 corresponding to the current time point. For example, the processor 250 generates information about the change in location of the external electronic device 202 based on the information on the tilt or the speed change of the external electronic device 202 received from the external electronic device 202. The information about the generated location change includes vector information. The vector information includes information on displacement of the external electronic device 202. For another example, the processor 250 receives information on the change of the location from the external electronic device 202. The information about the change of location received from the external electronic device 202 corresponds to information obtained by the processor 295 of the external electronic device 202 based on the information about the tilt or the speed change. The processor 250 predicts the current location of the external electronic device 202 based on information on the change in location and/or information on the location of the external electronic device 202 at the deviation time point. For example, the processor 250 determines an area where the external electronic device 202 deviates as a starting point and, identifies change of location according to the movement of the external electronic device 202 after deviation from the camera's field of view based on the starting point and/or vector information. The processor 250 displays a visual effect and/or a graphic object (e.g., arrow) separate from the visual effect for indicating the direction to which the external electronic device is located based on the predicted location of the external electronic device 202.

In various embodiments, the starting point and/or the vector information is changed based on the movement of the electronic device 201. The processor 250 acquires information about the movement of the electronic device 201 after the external electronic device 202 is out of the camera field of view 403. Information about the movement of the electronic device 201 is obtained by a sensor module (e.g., the sensor module 176 in FIG. 1) equipped in the electronic device 201. In one embodiment, after the external electronic device 202 deviates from the camera field of view 403, when the electronic device 201 rotates in the left direction (for example, wearing a VR device and rotating the head to the left), the starting point is changed based on the movement of the electronic device 201. For example, the starting point is moved to the left direction from the region at the time when the external electronic device 202 is deviated, by reflecting the leftward rotation of the electronic device 201. In another embodiment, if the electronic device 201 rotates in the left direction after the external electronic device 202 deviates from the camera field of view 403, vector information is changed based on the motion of the electronic device 201. For example, the vector information further includes information for indicating an additional location change to the right direction by reflecting the rotation in the left direction of the electronic device 201.

According to an embodiment, the processor 250 displays a part of the first graphic object. The first graphic object refers to a graphic object determined based on the multimedia content. For example, when the first graphic object corresponds to a sword, the processor 250 displays a part of the first graphic object with reference to the length of the sword. That is, when the external electronic device 202 deviates from the field of view of the camera 240, but does not move beyond the length of the sword, the processor 250 displays a part of the first graphic object. The processor 250 predicts the current location using vector information for the location change and the deviation location of the external electronic device 202, and when the distance between the predicted current location and the camera 240 is less than the length of the sword, a part of sword (for example, a blade) is displayed.

According to an embodiment, the processor 250 display the second graphic object which is different from the first graphic object by omitting the display of the first graphic object. The second graphic object corresponds to an object for indicating the user that the external electronic device 202 is located in an external area of the image displayed on the display 230. The second graphic object is an object different from the first graphic object. The second graphic object includes an image of the same or similar shape to that of the external electronic device 202. For another example, the second graphic object includes an arrow-shaped image for indicating that the external electronic device 202 is located outside the field of view of the camera 240. The processor 250, along with the second graphic object, further displays a guide phrase indicating that the external electronic device 202 is located outside the field of view of the camera 240. For example, when the distance between the predicted location of the external electronic device 202 and the camera 240 exceeds the length of the first graphic object, the processor 250 does not display the first graphic object. The processor 250 displays the second graphic object for indicating the current location of the external electronic device 202 because the first graphic object is not displayed.

The external electronic device 202 is configured to interlock with the electronic device 201 and provide user input in content related to virtual reality. The external electronic device 202 includes a memory 260, a communication module 270, a user input module 280, a sensor module 290 or a processor 295.

In various embodiments, the memory 260 includes the memory 130 shown in FIG. 1, and the communication module 220 includes the communication module 190 shown in FIG. 1, and a user The input module 280 includes the input device 150 shown in FIG. 1, and the sensor module 290 includes the sensor module 176 shown in FIG. 1.

In various embodiments, the user input module 280 receives a user input for controlling the electronic device 201 interlocked with the external electronic device 202. The user input module 280 is visually exposed through a part of the housing (not shown) of the external electronic device 202. In various embodiments, the user input module 280 includes a touch pad for receiving a user's touch input, a physical button capable of receiving physical pressure, or a physical key.

In various embodiments, the processor 295 is operatively or operably coupled with at least one of the memory 260, the communication module 270, the user input module 280, or the sensor module 290.

In various embodiments, the sensor module 290 includes a first sensor 292 or a second sensor 294. The first sensor 292 corresponds to a gyro sensor, and the second sensor 294 corresponds to an acceleration sensor.

In various embodiments, the processor 295 transmits information about the tilting of the external electronic device 202 to the electronic device 201. For example, the processor 295 acquires information about the tilting via at least one sensor. The at least one sensor includes a gyro sensor. The tilt information includes information for indicating a 3D angle change of the external electronic device 202. The tilt information includes data on a change amount of a pitch, a roll, and a yaw.

In various embodiments, the processor 295 transmits information about a change in the location of the external electronic device 202 to the electronic device 201. The information on the change in location includes information on the tilt or information on the speed change obtained by the first sensor 292 or the second sensor 294 of the external electronic device 202. For another example, the information about the change in location includes information indicating the amount of change in location obtained based on the information about the tilt or the speed change. The information indicating the location change amount corresponds to the vector information.

In one embodiment, the processor 295 adaptively transmits information about the change in the location to the electronic device 201. For example, the processor 295 transmits information on the change in the location to the electronic device 201 at predefined time intervals. The predefined time interval is changed based at least on the remaining battery power of the external electronic device 202 and the quality of wireless communication between the external electronic device 202 and the electronic device 201. For example, when the charge level of the battery of the external electronic device 202 is high, the predefined time interval is reduced to reflect the movement of the external electronic device 202 in real time. For another example, when the charge level of the battery of the external electronic device 202 is low, in order to increase the driving time of the external electronic device 202 and reduce power consumption, the predefined time interval is increased. For example, when the quality of the wireless communication is poor, the processor 295 reduces the predefined time interval to ensure reliability of data transmission. For another example, the processor 295 increases the predefined time interval when the quality of the wireless communication is good.

In another embodiment, the processor 295 transmits information about a change in the location along with different information transmitted to the electronic device 201. For example, the processor 295 receives a user's physical key input and transmits information on the change of the location along with the received input.

Although not shown, the external electronic device 202 further includes a light emitting part. For example, the light emitting part activates the light emitting part in response to detecting an on status of the external electronic device 202. For another example, the external electronic device 202 generates a light in response to receiving a signal instructing to emit light from the electronic device 201. The electronic device 201 is configured to acquire information on the location of the external electronic device 202 by capturing the light emitted from the light emitting part through the camera 240. In various embodiments, the light emitting part includes a light source of a light emitting diode (LED).

Figure 3:
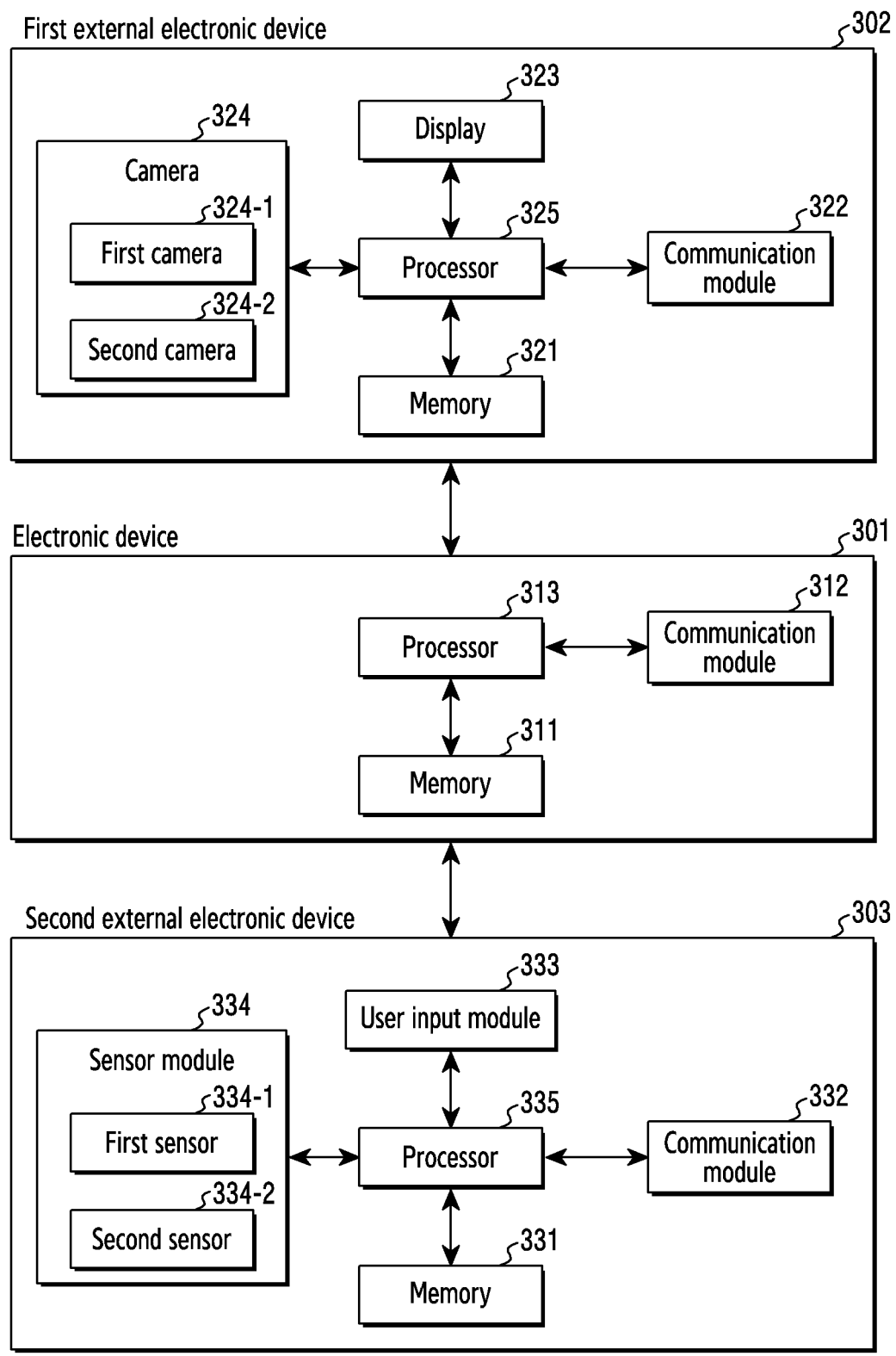
FIG. 3 illustrates an example of a functional configuration of an electronic device, a first external electronic device, and a second external electronic device according to various embodiments.

FIG. 3 illustrates an example of a functional configuration of an electronic device, a first external electronic device, and a second external electronic device according to various embodiments. The functional configuration of the second external electronic device 303 illustrated in FIG. 3 is included in the functional configuration of the external electronic device 202 illustrated in FIG. 2. The functional configuration of the electronic device 301 illustrated in FIG. 3 is included in the functional configuration of the electronic device 201 illustrated in FIG. 2.

Referring to FIG. 3, the first external electronic device 302 includes a memory 321, a communication module 322, a display 323, a camera 324 or a processor 325.

In various embodiments, the memory 321 includes the memory 210 shown in FIG. 2, and the communication module 322 includes the communication module 220 shown in FIG. 2, The display 323 includes the display 230 shown in FIG. 2, the camera 324 includes the camera 240 shown in FIG. 2, and the processor 325 includes the processor 250 shown in FIG. 2.

In various embodiments, the processor 325 is operatively coupled with at least one of the memory 321, the communication module 322, the display 323, and the camera 324.

In various embodiments, the processor 325 acquires information about the location of the second external electronic device 303. For example, when the second external electronic device 303 is located inside the field of view of the camera 324, the processor 325 acquires the image including the second external electronic device 303 via the camera 324. According to one embodiment, the processor 325 further includes a location tracking module. The location tracking module acquires information about the location of the second external electronic device 303 within the acquired image. The location tracking module corresponds to the location tracking module 252 of the processor 250 illustrated in FIG. 2. In another embodiments, the information about the location of the second external electronic device 303 is obtained by the electronic device 301. The processor 325 acquires an image including the second external electronic device 303 through the camera 324 and transmits the acquired image to the electronic device 301. The electronic device 301 obtains the information about the location of the second external electronic device 303 within the image including the second external electronic device 303 received from the first external electronic device 302.

In various embodiments, the processor 325 transmits information about the location corresponding to the deviation time point of the second external electronic device 303 to the electronic device 301. For example, the processor 325 determines whether the second external electronic device 303 has deviated from the field of view of the camera 324 based on the image acquired by the camera 324. The processor 325 determines, when detecting an area corresponding to illuminance of a threshold value or more in the acquired image, that the second external electronic device 303 is located in the detected area. For another example, the processor 325 determines, when an area corresponding to illuminance of the threshold or more is not detected in the acquired image, that the second external electronic device 303 deviates from the field of view of the camera 324. The processor 325 temporarily stores an image at a time point immediately before the time point when an area corresponding to the illuminance above the threshold or more is not detected in a buffer or the like. Accordingly, when the deviation is identified, the processor 325 identifies an image including the second external electronic device 303 among a plurality of images stored in a buffer or the like. The processor 325 acquires location information of the second external electronic device 303 at the deviation time from the identified image using the location tracking module.

In various embodiments, the processor 325 transmits a signal indicating the deviation to the electronic device 301. For example, the processor 325 transmits a signal indicating the deviation to the electronic device 301 in response to identifying the deviation. Since the electronic device 301 does not have a camera, it does not identify the deviation of the second external electronic device 303. Accordingly, the processor 325 transmits a signal indicating the deviation to the electronic device 301. In various embodiments, the processor 325 transmits information about the location of the second external electronic device 303 corresponding to the deviation time point, together with the above signal to the electronic device 301.

In various embodiments, the processor 325 displays an image related to the multimedia content or a graphic object corresponding to the second external electronic device 303 on the display 323. For example, the processor 325 receives data for the display from the electronic device 301. The processor 325 receives location information by which the second external electronic device 303 is predicted to be located from the electronic device 301, and displays a graphic object based on the predicted location information. The predicted location information is obtained by the electronic device 301. The predicted location information is obtained on the basis of the information about a change in the location transmitted from the second external electronic device 303 to the electronic device 301 or the information about the location of the second external electronic device 303 at a deviation time point transmitted from the first external electronic device 302 to the electronic device 301.

In various embodiments, the electronic device 301 generates a graphic object to be output on the display 323 of the first external electronic device 302. The graphic object includes multimedia content related to the VR (e.g., VR operation) and/or a graphic object corresponding to the external electronic device 303. For example, the processor 313 of the electronic device 301 receives information about the location of the second external electronic device 303 obtained from the first external electronic device 302 and/or information on the location of the second external electronic device 303 obtained from the second external electronic device 303, and generates a graphic object based on the received location information of the second external electronic device 303. The graphic object is transmitted to the first external electronic device 302 and output via the display 323.

FIG. 4A illustrates an example of a situation in which an external electronic device deviates from a camera's field of view according to various embodiments. The electronic device 201 illustrated in FIG. 4A corresponds to the electronic device 201 illustrated in FIG. 2. The external electronic devices 202-1 and 202-2 shown in FIG. 4A corresponds to the external electronic device 202 shown in FIG. 2.

Referring to FIG. 4A, the electronic device 201 corresponds to a state in which the electronic device 201 is worn on the user's body. The electronic device 201 includes a display 230 on one surface of a housing (not shown). The display 230 is arranged to face the user's eye in the worn state of the electronic device 201. The electronic device 201 includes a camera 240 on a surface opposite to one surface of the housing. The camera 240 is disposed on the opposite surface to acquire an image of an external environment in a direction corresponding to a user's gaze.

According to various embodiments, the external electronic device 202 corresponds to a state held by a user's hand. The external electronic device 202 includes two devices 202-1 and 202-2 (e.g., a controller) so that they are gripped by the user's left and right hands, respectively.

According to various embodiments, the camera 240 included in the electronic device 201 acquires an image of a field of view corresponding to a certain angle 401 (e.g., a viewing angle of the camera 240). For example, the camera 240 obtains an image of the external electronic device 202 when the external electronic device 202 is located within the angle 401 (e.g., when the user extends the arm in front). In one embodiment, the image of the external electronic device 202 includes an external image of the external electronic device 202 or an image of the housing. According to another embodiment, the image of the external electronic device 202 includes an LED, a pattern, or a marker. For example, the external electronic device 202 additionally includes an LED separately from the housing of the external electronic device in order to be easily recognized by the processor 250. Instead of recognizing the external electronic device 202 by processing an image of the housing of the external electronic device 202, the processor 250 identifies an image of the external electronic device 202 within the image obtained by the camera 240 by recognizing an LED emitting a brightness greater than or equal to a threshold illuminance value. For another example, the external electronic device 202 includes at least one marker. Each of the at least one marker includes markers in a distinguishable pattern. The processor 250 identifies the at least one marker from the image acquired by the camera 240 and identifies an external electronic device 202 within the acquired image. For another example, when the external electronic device 202 deviates from the angle 401 (e.g., when a user spreads his or her arms out to both sides), the external electronic device 202 deviates from a field of view of the camera 240 and the camera 240 does not acquire an image 413 for the external electronic device 202.

FIG. 4B illustrates an example for comparing a field of view corresponding to a camera of an electronic device and a field of view corresponding to a user's gaze according to various embodiments. Referring to FIG. 4B, a size of an area displayed on the display 230 and an area of an image acquired through the camera 240 is different. According to an embodiment, the field of view of the camera 240 includes a larger area than the user's field of view (e.g., an area displayed on the display 230). For example, referring to the image (a) illustrated in FIG. 4B, an area 410 indicated by a solid line corresponds to an area displayed on the display 230. The area 412 indicated by a dotted line indicates the size of the area that the camera 240 acquires. Accordingly, the processor 250 acquires an image including the external electronic device 202 when the external electronic device 202 is located within the field of view of the camera 240 even if the external electronic device 202 is out of the user's field of view. The processor 250 obtains information on the location of the external electronic device 202 based on the image including the external electronic device 202. Accordingly, the processor 250 displays the graphic object 411 corresponding to the external electronic device 202 based on the obtained location information.

According to another embodiment, the field of view of the camera 240 is the same as that of the user. For example, referring to the image (b) illustrated in FIG. 4B, the size of the area 410 indicated by a solid line is the same as or similar to the size of the area 414 indicated by a dotted line. Accordingly, when the external electronic device 202 is out of the user's field of view, the processor 250 does not acquire an image of the external electronic device 202 because it is out of the field of view of the camera 240. When the external electronic device 202 is located inside the user's field of view, the processor 250 acquires an image of the external electronic device 202 because it is located inside the field of view of the camera 240. Accordingly, the processor 250 obtains information on the location of the external electronic device 202 based on the image, and displays a graphic object 411 corresponding to the external electronic device 202.

According to another embodiment, the field of view of the camera 240 includes an area smaller than that of the user. For example, referring to the image (c) illustrated in FIG. 4B, the size of the area 416 indicated by a dotted line is smaller than the area 410 indicated by a solid line. Accordingly, the processor 250 does not acquire an image including the external electronic device 202 when the external electronic device 202 is located outside the field of view of the camera 240 even though the external electronic device 202 is located inside the user's field of view. The processor 250 transmits a request signal to the external electronic device 202 to transmit information about a change in the location of the external electronic device 202. The processor 250 acquires the location of the external electronic device 202 based on the information on the change in the location, and displays a graphic object 411 corresponding to the external electronic device 202 on the acquired location.

Figure 5A:
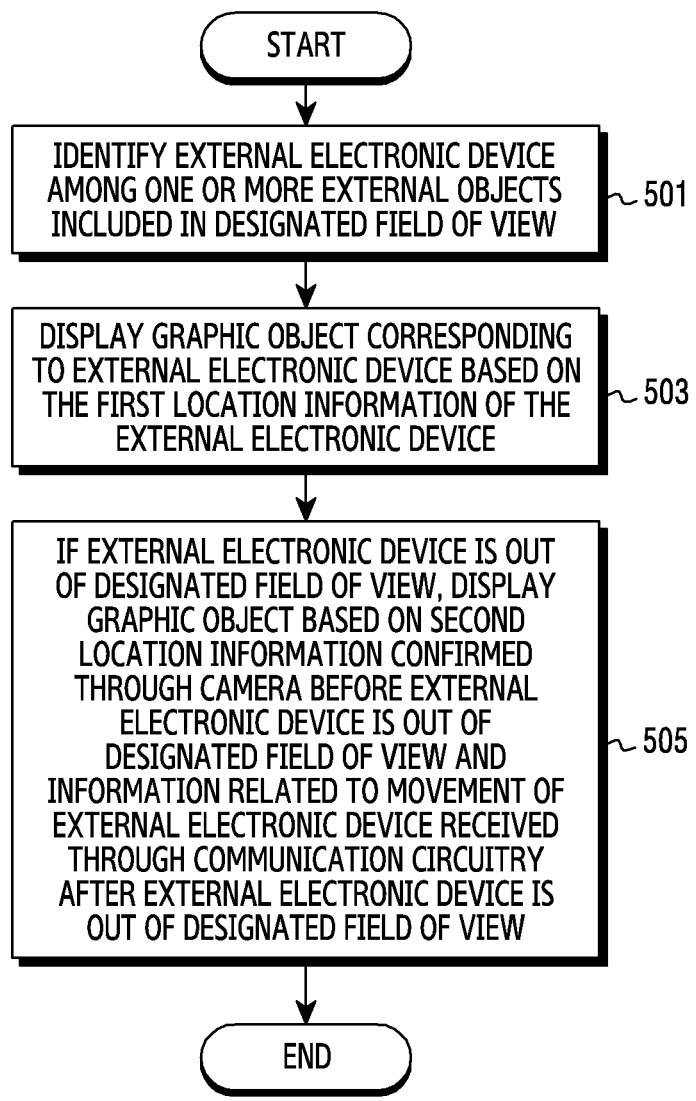
FIG. 5A illustrates an example of operation of an electronic device according to various embodiments.

FIG. 5A illustrates an operation of an electronic device according to various embodiments. Such an operation is performed by the electronic device 201 illustrated in FIG. 2 or the processor 250 included in the electronic device 201.

Referring to FIG. 5A, in operation 501, the processor 250 identifies an external electronic device among one or more external objects included in a designated field of view using a camera. The processor 250 acquires an image of the surrounding environment of the electronic device 201 through the camera. The image includes a plurality of objects located around the electronic device 201. The processor 250 identifies the external electronic device 202 among the plurality of objects. For example, the external electronic device 202 further includes a light emitting part. The processor 250 identifies the external electronic device 202 by identifying a light source exceeding a predetermined illuminance in the image acquired through the camera.

According to an embodiment, the external electronic device 202 adjusts the brightness of the LED based on the ambient brightness. The external electronic device 202 further includes an illuminance sensor (not shown), and acquire a value of the lux (illuminance) of the ambient brightness of the external electronic device 202 using the illuminance sensor (not shown). The external electronic device 202 adjusts the brightness of the light source based on the value of the lux of the ambient brightness. For example, the external electronic device 202 outputs light having a first brightness corresponding to the first section in response to identifying that the value of the lux of the ambient brightness is included in the first section. For another example, in response to identifying that the value of the lux of the ambient brightness is included in the second section, light of the second brightness corresponding to the second section is output. The first brightness corresponds to an illuminance value required to be separately identified from the ambient brightness of the first section. The second brightness corresponds to an illuminance value required to be separately identified from the ambient brightness of the second section.

In operation 503, the processor 250 displays a graphic object corresponding to the external electronic device on the display based on the first location information of the external electronic device 202. The processor 250 displays the graphic object on the identified location of the external electronic device 202. The graphic object is determined based on multimedia content. For example, the graphic object includes images of various shapes, such as a knife, a tennis racket, or a car wheel.

In operation 505, the processor 250, if the external electronic device 202 is out of the designated field of view, displays the graphic object on the display based on the second location information confirmed through the camera before the external electronic device 202 is out of the designated field of view and information related to movement of the external electronic device received from the external electronic device through the communication circuitry after the external electronic device 202 is out of the designated field of view. According to an embodiment, the processor 250 stores the second location information at a time point when the external electronic device 202 deviates from the designated field of view. The second location information is located at one point of the boundary surface of the image displayed on the display 210. According to an embodiment, the processor 250 receives information related to the movement of the external electronic device 202 from the external electronic device 202 from a time point at which the external electronic device 202 is out of the designated field of view. The movement related information includes data obtained by a gyro sensor and/or data obtained by an acceleration sensor. The processor 250 generates a vector value for movement of the external electronic device based on the information related to the movement. The vector value is obtained by determining the size and/or direction of the vector according to information related to the movement, with a region where the external electronic device 202 deviates as a starting point.

Figure 5B:
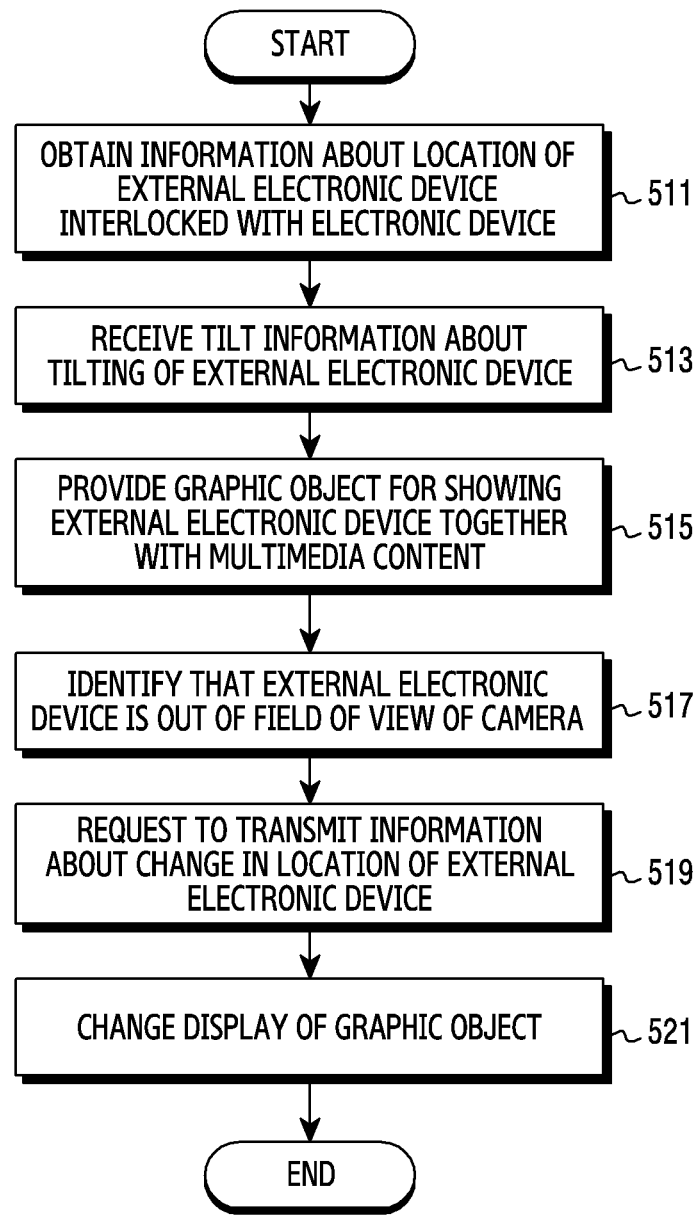
FIG. 5B illustrates an example of an operation of an electronic device according to various embodiments.

FIG. 5B illustrates an operation of an electronic device according to various embodiments. Such an operation is performed by the electronic device 201 illustrated in FIG. 2 or the processor 250 included in the electronic device 201.

In operation 511, the processor 250 obtains information about the location of the external electronic device 202 interlocked with the electronic device 201. Information on the location of the external electronic device 202 refers to information on coordinate values identified by the external electronic device 202 in an image acquired by the camera 240. In one embodiment, the processor 250 acquires an image via the camera 240. The processor 250 obtains an x coordinate value and/or a y coordinate value based on the image. For example, by analyzing the image, the processor 250 identifies a coordinate value corresponding to an area in which the external electronic device 202 is located in the image. In another embodiment, the processor 250 obtains depth information based on image analysis of the image. The processor 250 obtains a z coordinate value based on the obtained depth information and/or the obtained x coordinate value and y coordinate value.

In operation 513, the processor 250 receives tilt information about the tilting of the external electronic device 202. The tilt information includes sensor data obtained by the first sensor 292 included in the external electronic device 202. For example, the tilt information includes information about at least one change amount of pitch, roll, or yaw. According to an embodiment of the present disclosure, the tilt information is configured to be automatically transmitted from the external electronic device 202 to the electronic device 201 in response to an on-status or an activation state of the external electronic device 202. According to another embodiment, the tilt information is configured to be transmitted to the electronic device 201 in response to the request from the electronic device 201.

In operation 515, the processor 250 provides a graphic object for representing the external electronic device 202 together with multimedia content. The processor 250 uses the obtained information on the tilt of the external electronic device 202 and/or the location of the external electronic device 202 obtained by the camera 240, thereby allowing the graphic object to be displayed. For example, the processor 250 obtains coordinate values for x, y, and z from the camera 240, and receives information on tilt from the external electronic device 202, and determines the shape of the external electronic device 202 in a three dimensional space. The processor 250 displays a graphic object to correspond to the determined shape of the external electronic device 202. For example, the graphic object is displayed with the same tilt on the same coordinates as the external electronic device 202. According to various embodiments, the graphic object is determined based on multimedia content. For example, when the multimedia content is tennis-related content, the graphic object includes a shape of a tennis racket. For another example, when the multimedia content is content related to a combat game, the graphic object includes the shape of a knife or sword.

In operation 517, the processor 250 identifies that the external electronic device 202 is out of field of view of the camera. The processor 250 determines that the external electronic device 202 does not exist based on the image acquired by the camera 240. For example, when the image acquired by the camera 240 does not include an image of light emitted from a light emitting part (not shown) of the external electronic device 202, the processor 250 identifies the deviation of the electronic device 202. For another example, when a region brighter than a predetermined illuminance is not detected in the acquired image, the processor 250 determines that the external electronic device 202 has deviated. According to an embodiment, the processor 250 stores information on the location of the external electronic device 202 at the deviation time point. For example, the processor 250 stores information on the location where the external electronic device 202 deviates in response to detecting the deviation.

In operation 519, the processor 250 requests to transmit information about a change in the location of the external electronic device 202. When the external electronic device 202 deviates from the field of view of the camera 240, the processor 250 does not acquire information about the location of the external electronic device 202. The processor 250 transmits a signal requesting the external electronic device 202 to transmit information about a change in the location of the external electronic device 202. According to various embodiments, the request signal includes a control signal instructing to activate the second sensor 294 of the external electronic device 202. For example, when the external electronic device 202 is included in the field of view of the camera 240, the external electronic device 202 activates only the first sensor 292, and information about tilting obtained from the first sensor 292 is transmitted to the electronic device 201. For another example, when the external electronic device 202 deviates from the field of view of the camera 240, the external electronic device 202 receives the control signal from the electronic device 201, and activates the second sensor 294. The external electronic device 202 transmits information on the tilt obtained by the first sensor 292 and/or information on a change in speed of the external electronic device 202 obtained by the second sensor 294 to the electronic device 201. For another example, the second sensor 294 transmits information on the speed change to the electronic device 201 regardless of receiving a control signal indicating the activation of the second sensor 294 from the electronic device 201. The processor 295 of the external electronic device 202 confirms (e.g., detects) information related to driving the external electronic device 202 (e.g., power-on), and in response to the confirmation, activates the second sensor 294. In addition, the processor 295 further includes a grip sensor (not shown), and the grip sensor (not shown) detects that the external electronic device 202 is held by the user. The processor 295 receives a sensor value from the grip sensor (not shown), and activates the second sensor 294 in response to the reception of the sensor value. When the second sensor 294 is activated in response to a power-on or receiving the sensor value from the grip sensor (not shown) of the external electronic device 202, information about the tilt of the external electronic device 202 acquired by the first sensor 292 and information about the speed change of the external electronic device 202 obtained by the second sensor 294 are transmitted to the electronic device 201 together. According to various embodiments, the processor 250 obtains a vector value for a change in the location of the external electronic device 202. The processor 250 receives information on the change of the location from the external electronic device 202, and the received information includes the data acquired by the first sensor 292 and/or the second sensor 294. The processor 250 obtains a vector value based on the data on the tilting of the external electronic device 202 obtained by the first sensor 292 and/or the data on the speed change of the external electronic device 202 obtained by the second sensor 294. The vector value includes information indicating how far and in what direction the external electronic device 202 has moved from location information corresponding to a deviation time point from the field of view of the camera 290.

In various embodiments, the processor 250 determines information about a change in the location of the external electronic device 202 based on information about the change in the location of the electronic device 201. For example, the electronic device 201 includes a sensor module (not shown). The sensor module (not shown) includes an acceleration sensor and/or a gyro sensor. The gyro sensor acquires information on the tilt of the electronic device 201, and the acceleration sensor acquires information on a speed change of the electronic device 201. The electronic device 201 obtains information on a change in the location of the electronic device 201 when the electronic device 201 does not receive information on the tilt or speed change of the external electronic device 202 from the first sensor 292 or the second sensor 294 for a predetermined time, or receives information indicating null. The processor 250 determines that the electronic device 201 has deviated from the field of view of the camera 240 due to the movement of the electronic device 201 without movement of the external electronic device 202 when the information indicating the null is received from the external electronic device 202, or if the information is not received for the predetermined time. Accordingly, the electronic device 201 acquires information on a change in the location of the electronic device 201, and generates information on the change in the location of the external electronic device 202 based on the information on the change in the location of the electronic device 201. For example, in the case where the electronic device 201 moves in the field of view of the camera 240 in the upper right direction, it is determined that the external electronic device 202 moves in the opposite direction (e.g., the lower left direction). This is because a change in the location of the external electronic device 202 appears in a direction opposite to the moving direction of the electronic device 201 based on the user's field of view (e.g., the display 230).

In operation 521, the processor 250 changes the display of the graphic object. The processor 250 determines a location where the external electronic device 202 is predicted to move based on the received information about the change in the location of the external electronic device 202. The processor 250 changes the display of the graphic object to correspond to the predicted location. According to an embodiment, the processor 250 changes a display of the graphic object so that a part of the graphic object is displayed and the remaining part is not displayed. For example, referring to the image 720 of FIG. 7, only a part of the graphic object including the shape of a knife is displayed. According to another embodiment, the processor 250 does not display the graphic object. For example, referring to the image 740 of FIG. 7, the processor 250 does not display the graphic object including the shape of a knife, but only an image related to multimedia content. The processor 250 stops displaying the graphic object when the predicted location of the external electronic device 202 is outside a predefined distance based on the information about the tilt information of the external electronic device 202 and/or the information about the speed change of the external electronic device 202. For example, when the graphic object includes a shape having a long length, the processor 250 sets a large size of a predefined distance. For another example, when the graphic object includes a shape having a short length, the processor 250 sets a small size of the predefined distance.

Figure 6:
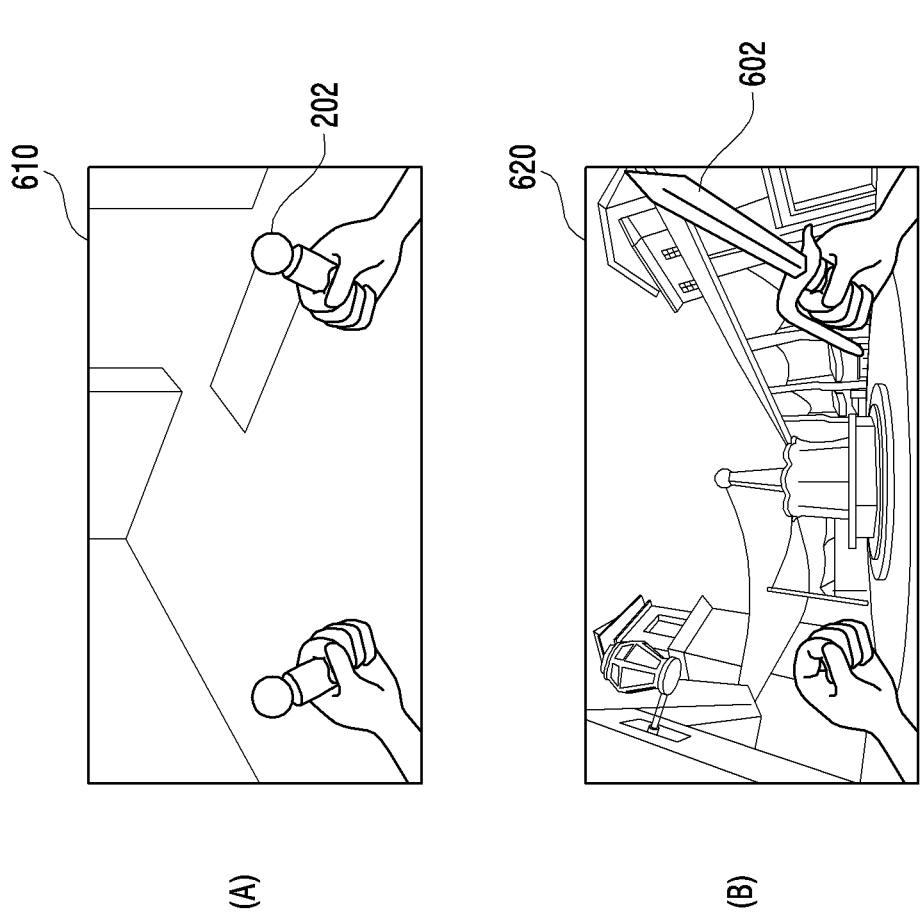
FIG. 6 illustrates an example of an external electronic device and a graphic object displayed corresponding to the external electronic device according to various embodiments.

FIG. 6 illustrates an example of an external electronic device and a graphic object displayed to correspond to the external electronic device according to various embodiments.

Referring to FIG. 6A and FIG. 6B, the processor 250 acquires the camera image 610 using the camera 240. For example, the camera image 610 includes an external electronic device 202, a user's hand for gripping the external electronic device 202 and an image of the external environment in which the user is located.

In various embodiments, the processor 250 displays the display image 620 on the display 230. For example, the display image 620 includes multimedia content and/or the graphic object 602 corresponding to the external electronic device 202. For example, the graphic object 602 includes an image corresponding to the shape of a knife or a sword.

According to various embodiments, the processor 250 displays the graphic object 602 and multimedia content in superimposed pattern. The processor 250 renders or displays a background image related to multimedia content. For example, when the content is related to tennis, the background image corresponds to an image related to a tennis court or a tennis stadium. For example, the processor 250 displays the tennis racket on a location corresponding to the external electronic device 202 in the background images associated with the tennis court or tennis stadium, so that the background image and/or the graphic object are superimposed. The electronic device 201 provides immersive services related to VR by displaying multimedia content and/or a graphic object 602 superimposed on the multimedia content on the display 230.

Figure 7:
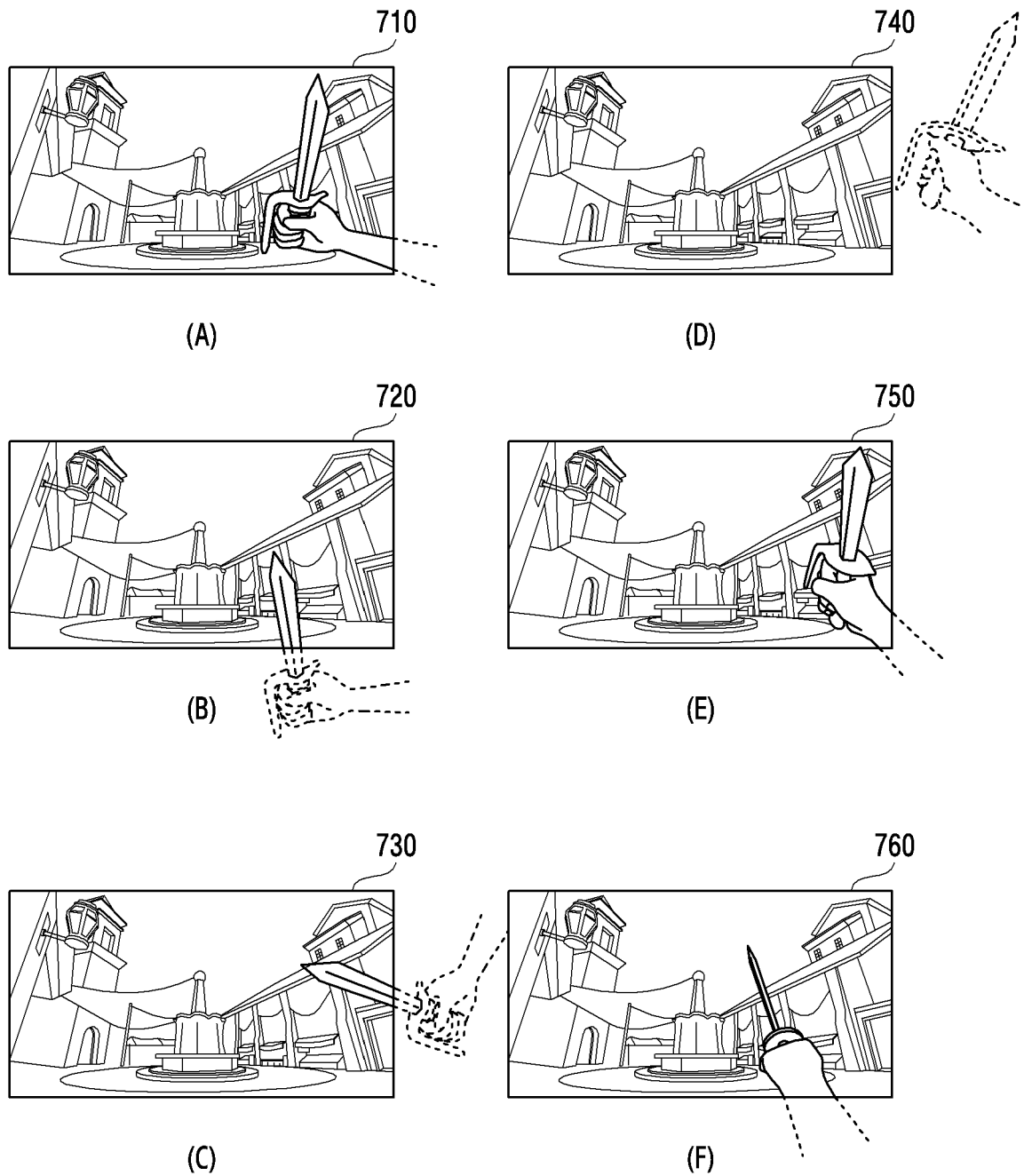
FIG. 7 illustrates a time flow of a display displayed according to an operation of an electronic device according to various embodiments.

FIG. 7 illustrates a change in display over time according to various embodiments. Hereinafter, the images 710 to 760 displayed on the display 230 include images corresponding to a user's field of view. In various embodiments, the field of view of the camera 240 is the same as that of the display area of the images 710 to 760 displayed on the display. However, the field of view of the camera 240 is not limited thereto, and as illustrated in FIG. 4B, it is smaller or larger than the user's field of view.

Referring to FIG. 7A to FIG. 7F, according to various embodiments, the processor 250 displays the image 710. When the external electronic device 202 is located inside the field of view of the camera 240, the processor 250 obtains information about the location of the external electronic device 202 based on the image acquired by the camera 240. The processor 250 displays the image 710 based on the information on the tilt of the external electronic device 202 and/or the location information received from the external electronic device 202. The processor 250 identifies the location of the electronic device 201 located within the field of view of the camera 240, and displays a graphic object in a three-dimensional object (e.g., a knife or a sword). For example, referring to the image 710, the graphic object is displayed as an image including the shape of a knife. The image including the shape of the knife is displayed based on information on the location of the electronic device identi- fied using the camera 240 and information on the tilt received from the external electronic device 202, and as shown in the image 710, it is displayed to be inclined in the same manner as the external electronic device 202 in the three-dimensional space. According to one embodiment, the processor 250 identifies the external electronic device 202 within the image obtained by the camera 240, and displays the knife on a location corresponding to the identified external electronic device 202. The processor 250 receives information about the tilting of the external electronic device 202 from the external electronic device 202, and based on the received information about the tilting, the tilting of the handle of the knife and the tilt of the knife blade are displayed. For example, the processor 250 identifies an area brightly indicated by the LED in the image acquired by the camera 240 and, based on information about the tilting of the external electronic device 202, it marks the handle part of the knife and the blade part of the knife which are tilted at 45 degrees to the left. The handle part of the knife is marked on the identified area.

According to various embodiments, the processor 250 displays the image 720. When the external electronic device 202 deviates from the field of view of the camera 240, the electronic device 201 stores location information at the time point of deviation. For example, the processor 250 detects the deviation when it fails to detect the brightness of a threshold illuminance value or higher in the image acquired by the camera 240. For another example, the processor 250 identifies the external image of the external electronic device 202 or the image of the marker attached to the external electronic device 202 within the acquired image based on image processing of the image acquired by the camera 240. The processor 250 determines that the external electronic device 202 is out of field of view of the camera 240 when it fails to detect the external image or the image for the marker. The processor 250 requests the external electronic device 202 to transmit information about a change in the location of the external electronic device 202 in response to detecting the deviation. For example, referring to the image 720, the user's hand is deviated from the camera's field of view. According to an embodiment, the processor 250 displays a part of the graphic object. For example, if the external electronic device 202 does not move away by a predefined distance after the deviation time, the processor 250 displays only a part of the graphic object. Referring to the image 720, the external electronic device 202 does not move a distance exceeding the length of the knife after deviating from the field of view of the camera 240. Accordingly, the processor 250 does not display the handle portion of the knife corresponding to the external electronic device 202 and displays a part of the graphic object corresponding to the blade portion of the knife.

According to various embodiments, the processor 250 displays the image 730. The processor 250 receives information about a change in location from the external electronic device 202. The processor 250 predicts that the external electronic device 202 has moved in the upper right direction by a certain distance based on the received information on the speed change of the external electronic device 202 and/or information on the tilt of the external electronic device 202. The processor 250 changes the display of the inclined angle of the graphic object, as illustrated in the image 730 by reflecting the tilt information. The processor 250 receives information of tilting of the external electronic device 202 while not displaying the handle portion of the knife corresponding to the external electronic device 202, and displaying the graphic object corresponding to the blade portion of the knife. For example, the processor 250 receives information on the tilt indicating that the external electronic device 202 is further tilted to the left after the external electronic device 202 is out of field of view of the camera 240. Though the external electronic device 202 is not included in the image acquired by the camera 240, the processor 250 changes the angle of the displayed blade portion based on the tilt information. The processor 250 displays a graphic object corresponding to the blade of the knife to be tilted to the left based on the received tilt information.

According to various embodiments, the processor 250 displays the image 740. The processor 250 receives information about a change in the location of the external electronic device 202 and does not display a graphic object corresponding to the external electronic device 202 on the display 230. For example, the processor 250 acquires a predicted location to which the external electronic device 202 has been moved based on data on the speed change of the external electronic device 202 and/or data on tilt. When the predicted location is located farther than a predetermined distance, the processor 250 does not display a graphic object including the shape of the knife. The predetermined distance is, for example, a distance equal to a length of a graphic object including the shape of the knife.

According to various embodiments, the processor 250 displays the image 750 and/or the image 760. The processor 250 detects that the external electronic device 202 has moved into the field of view of the camera 240. Accordingly, the processor 250 acquires information about the location of the external electronic device 202 through the camera 240 and displays the graphic object. According to an embodiment, the processor 250 displays an image 750 corresponding to the external electronic device 202 at a time point when the external electronic device 202 enters into the field of view of the camera 240. The processor 250 displays a graphic object at the time of re-entry based on the information on the tilting of the external electronic device 202. For example, the processor 250 identifies the entry location of the external electronic device 202 based on the image acquired at the entry time point. The processor 250 determines the degree of tilting of the graphic object to be displayed on the entry location based on the information on the tilting of the external electronic device 202 among the information on the change in the received location. The processor 250 displays the graphic object based on the determined tilting degree and/or the entry location.

Figure 8:
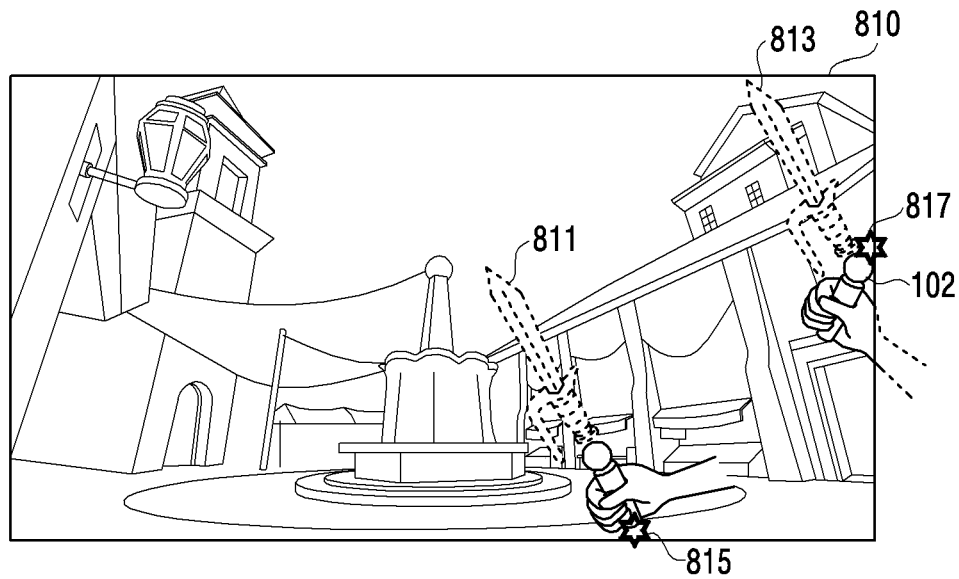
FIG. 8 illustrates an example for comparing the effect of correction using sensor data according to various embodiments.
Figure 8:
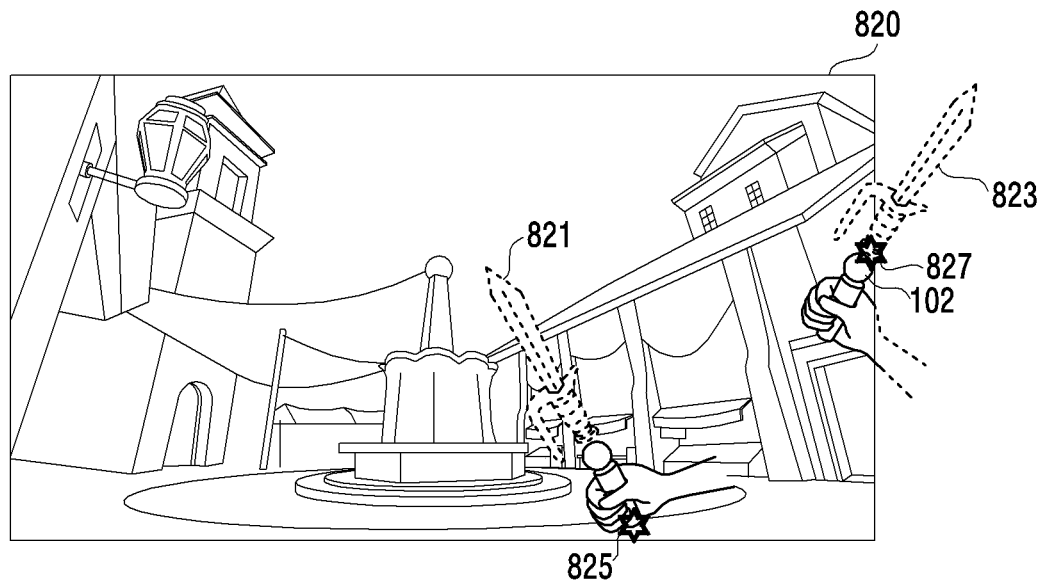

FIG. 8 illustrates an example for comparing the effect of correction based on information on a change in the location of an external electronic device according to various embodiments.

Hereinafter, the images 810 and 820 displayed on the display 230 includes images corresponding to a user's field of view. In various embodiments, the field of view of the camera 240 is the same as the field of view of the display areas of the images 810 and 820 displayed on the display 230. However, the field of view of the camera 240 is not limited thereto, and as illustrated in FIG. 4B, it is smaller or larger than the user's field of view.

Referring to the image FIG. 8A, the image 810 corresponds to an image in which the display of the graphic object is not corrected by using information on the change of the location. For example, the processor 250 stores information corresponding to the deviation time point of the external electronic device 202. The processor 250 stores the location (hereinafter, the first location information) 815 and/or the slope (first sensor information) of the external electronic device with respect to the deviation time point. Thereafter, when the external electronic device 202 moves into the field of view of the camera 240, the processor 250 detects the external electronic device 202. The processor 250 displays a graphic object 813 for the entry time point of the external electronic device 202. For example, the processor 250 does not receive information about tilting from the external electronic device 202 after the deviation time point. The processor 250 displays the graphic object 813 according to the location (hereinafter, second location information) 817 of the external electronic device 202 with respect to the entry time point of the external electronic device 202. Since the processor 250 has not yet received the information on the tilting of the external electronic device 202 at the entry time point, the processor 250 displays the graphic object 813 based on the first sensor information and/or the second location information. Thus, while actual external electronic device 102 is inclined toward the upper right, the processor 250 displays the graphic object 813 according to the slope corresponding to the deviation time point of the external electronic device 202.

Referring to the image FIG. 8B, the image 820 corresponds to an image in which the display of the graphic object is corrected by using information on the change of the location. For example, the processor 250 receives information on a change in the location of the external electronic device 202 from the external electronic device 202 during a time range from the deviation time point to the entry time point. The processor 250 identifies information on the tilting of the external electronic device 202 corresponding to the entry time point, based on the information on the change in the received location. Accordingly, the processor 250 displays the graphic object 823 based on the second location information 827 corresponding to the entry time point of the external electronic device 202 and/or information on the tilting of the external electronic device 202 corresponding to the entry time point. For example, referring to FIG. 8A and FIG. 8B, graphic objects 811 and 821 corresponding to the deviation time point of the external electronic device 202 is tilted toward the upper left at the deviation time point. Then, referring to FIG. 8B, the graphic object 823 displayed at the entry time point of the external electronic device 202 does not face the upper left, but it is displayed tilted to the top right to match the tilting of the external electronic device 202. In the above-described embodiments, the processor 250 displays the graphic object naturally at the entry time point by receiving information about a change in location of the external electronic device 202 from the external electronic device 202 during a time from when the external electronic device 202 deviates from the field of view of the camera 240 and then enters again the field of view of the camera 240.

Figure 9A:
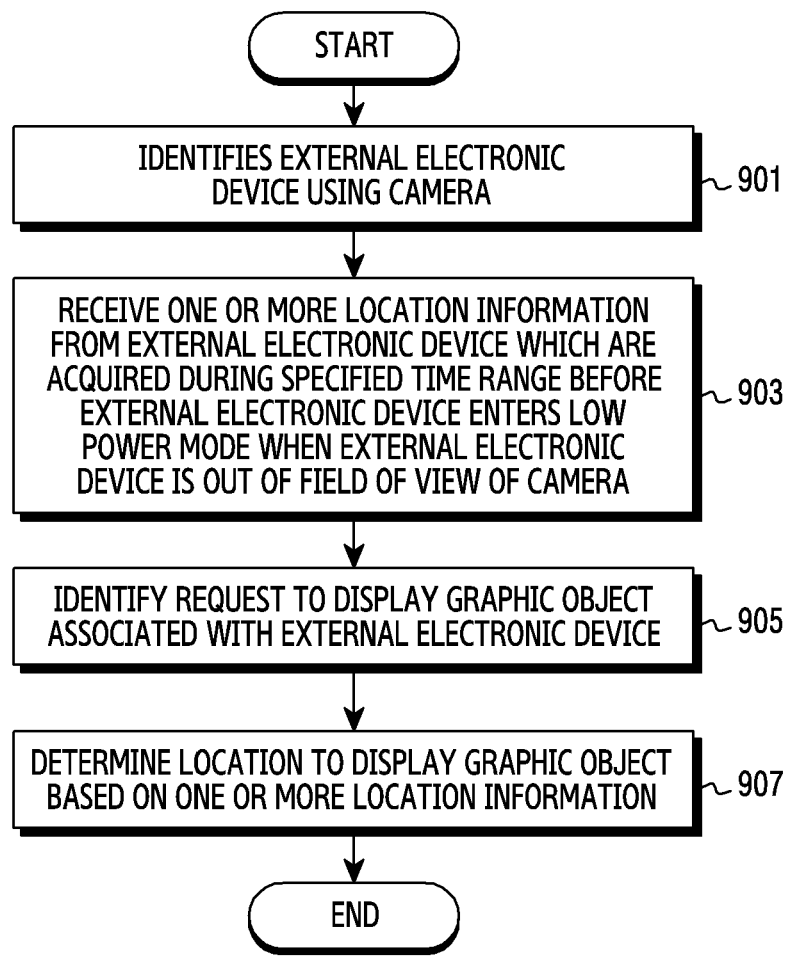
FIG. 9A illustrates an example of an operation of an electronic device according to various embodiments.

FIG. 9A illustrates an example of an operation of an electronic device according to various embodiments. Such an operation is performed by the electronic device 201 illustrated in FIG. 2.

In operation 901, the processor 250 identifies the external electronic device 202 using the camera 240. According to an embodiment, the processor 250 acquires an image of the external environment through the camera 240. The image of the external environment includes a number of external objects. The processor 250 identifies the external electronic device 202 among the plurality of external objects. For example, the external electronic device 202 further includes a light emitting part for generating light outside the housing. The processor 250 identifies the external electronic device 202 by identifying an area brighter than a predetermined illuminance in an image acquired through the camera.

In operation 903, when the external electronic device 202 is out of the camera's field of view, the processor 250 receives one or more location information from the external electronic device 202 which is acquired during a specified time range before the external electronic device 202 enters a low power mode. According to an embodiment, the low power mode corresponds to a mode for reducing power consumption of the external electronic device 202. The external electronic device 202 determines to enter the low power mode and controls the amount of power provided to a plurality of components. For example, the external electronic device 202 changes the operation cycle of the sensor module 290 into a long cycle to reduce power consumption, and decreases the number of operations of the sensor module 290. According to various embodiments, the low power mode is referred to by various terms including a sleep mode, a sleeping mode, an inactive mode, an inactive state, a deactivation state, and the like. According to an embodiment, the external electronic device 202 performs a low power mode in which the external electronic device 202 does not perform a data acquisition operation by the sensor module 290 during the specified time range. When the external electronic device 202 acquires at least one of the information on the tilt obtained by the first sensor 292 and/or information on the speed change obtained by the second sensor 294, the external electronic device 202 does not enter the low power mode. When the external electronic device 202 does not enter the low power mode, the external electronic device 202 monitors the acquisition of the above at least one information during the above specified time range from a time point corresponding to the acquisition of the at least one information. According to various embodiments, the external electronic device 202 acquires one or more location information during the specified time range. The sensor module 290 is activated from the specified time range, that is, from the last time a user input is received, to a time when the low power mode is performed. The sensor module 290 receives information on the tilting of the external electronic device 202 corresponding to a time range from the time when the user input is received to the time when the low power mode is performed.

In operation 905, the processor 250 receives a display request to display a graphic object associated with the external electronic device 202. The display request is based on a change in the operation mode of the external electronic device 202. For example, the processor 250 detects that the operation mode is changed from an inactive mode to an active mode, and in response to the detection, receives a request signal requesting display of a graphic object. The request signal corresponds to a signal received from another electronic device (e.g., the second external electronic device 202). According to another embodiment, the request signal includes a control signal received from elements of the external electronic device 202. For another example, the display request of the graphic object is generated by detecting that the data value of the external electronic device 202 acquired by the first sensor 292 exceeds the threshold value. For example, when the external electronic device 202 detects a motion exceeding a predetermined threshold, the display request for the graphic object is transmitted to the electronic device 201. For another example, the external electronic device 202 does not generate the display request when the detected change amount of motion does not exceed a predetermined threshold (e.g., vibration due to carelessness of the user is a case). For another example, the external electronic device 202 further includes a grip sensor (not shown). The external electronic device 202 generates the display request when the grip sensor detects a grip of the user.

In operation 907, the processor 250 determines a location to display the graphic object based on the one or more location information. The one or more location information includes information on a location where the external electronic device 202 deviates from the field of view of the camera 240, the first sensor information corresponding to a time point when entering the low power mode, and the second sensor information corresponding to a time point when releasing from the low power mode.

Figure 9B:
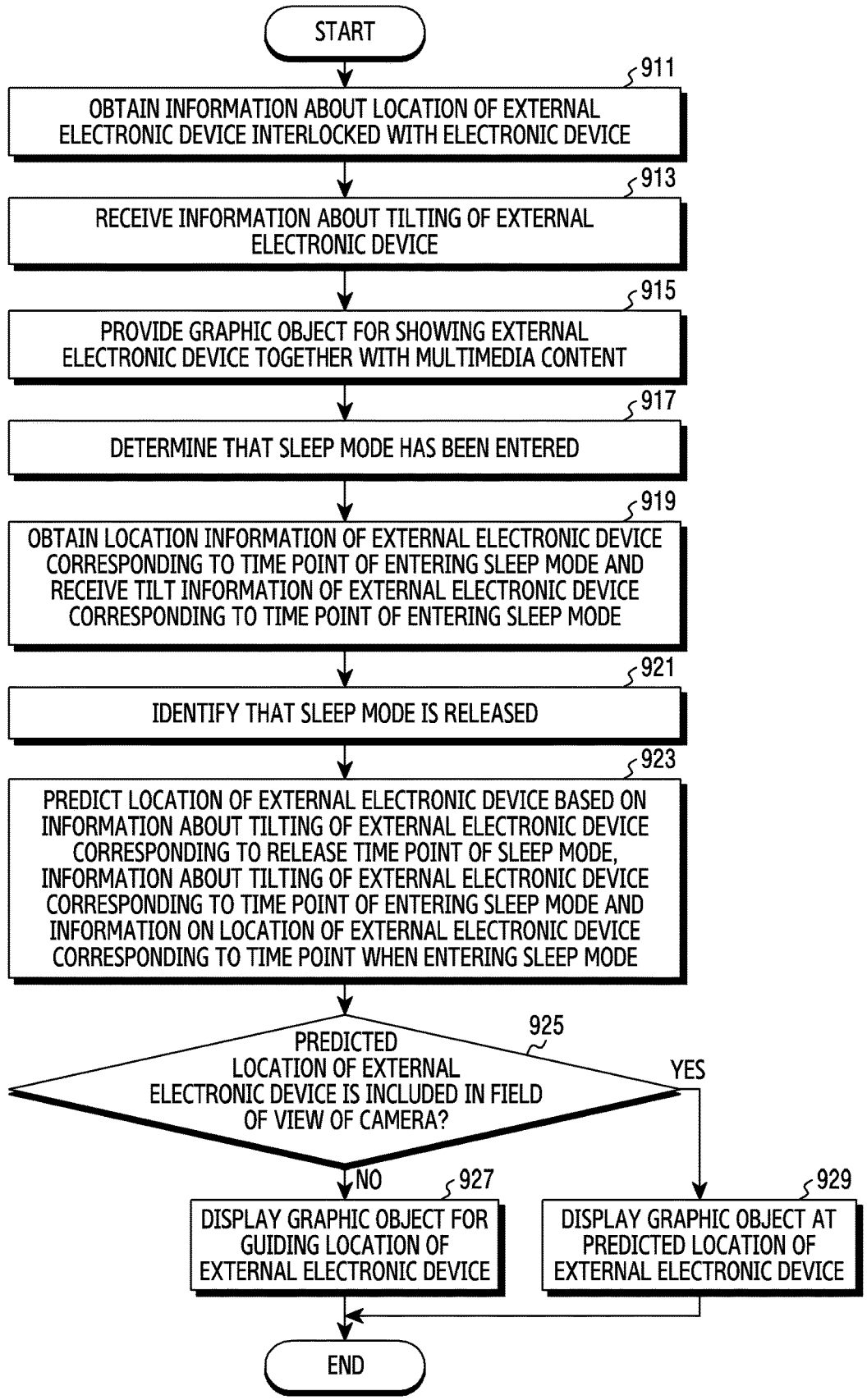
FIG. 9B illustrates an example of an operation of an electronic device according to various embodiments.

FIG. 9B illustrates an example of an operation of an electronic device according to various embodiments. Such an operation is performed by the electronic device 201 illustrated in FIG. 2.

In operation 911, the processor 250 obtains information about the location of the external electronic device 202 interlocked with the electronic device 201. In operation 913, the processor 250 receives information about the tilting of the external electronic device 202. In operation 915, the processor 250 provides a graphic object (visual object) for representing the external electronic device 202 together with multimedia content. The operations 911 to 915 correspond to operations 511 to 515 shown in FIG. 5B, respectively.

In operation 917, the processor 250 determines that the sleep mode has been entered. The sleep mode corresponds to a mode for reducing power consumption of the external electronic device 202. According to an embodiment, when the user input is not received for a predetermined length of time, the processor 250 determines that entering the sleep mode has been performed.

In operation 919, the processor 250 receives location information and/or tilt information of the external electronic device 202 corresponding to a time point of entering the sleep mode. For example, when the processor 250 does not receive a user input for a predetermined length of time, the processor 250 determines that a low power mode has been entered, and controls to receive information related to the external electronic device 202 corresponding to the entry time point for the low power mode.

In operation 921, the processor 250 identifies that the sleep mode is released. The sleep mode is released by receiving a wake-up signal from the external electronic device 202. The wake-up signal is referred to in various terms such as a paging signal, an activation signal and the like. For example, the wake-up signal is generated when a motion of the external electronic device 202 exceeding a predefined threshold value of the external electronic device 202 is detected. For another example, the external electronic device 202 further includes a grip sensor (not shown). The external electronic device 202 generates the wake-up signal based on obtaining data, from the grip sensor, indicating that the user has gripped the external electronic device 202.

In operation 923, the processor 250 predicts the location of the external electronic device 202 based on the information about the tilting of the external electronic device 202 corresponding to the release time point of the sleep mode, the information about the tilting of the external electronic device 202 corresponding to the time point of entering the sleep mode and/or the information on the location of the external electronic device 202 corresponding to a time point when entering the sleep mode. According to an embodiment, the processor 250 predicts a change in the location of the external electronic device 202 by comparing a difference between information corresponding to the entry time of the sleep mode and/or information corresponding to the release time among information on the tilting of the external electronic device 202. The processor 250 obtains a location predicted to be located at the time of the release of the sleep mode by applying the information on the change of the predicted location to the location information of the entry time of the sleep mode.

According to various embodiments, the processor 250 predicts the location based on the information on the tilting of the electronic device 201. For example, the electronic device 201 moves between the time point of entering the sleep mode and the time point of releasing the sleep mode. In order to reflect the movement of the electronic device 201, the processor 250 compares the information on the tilting of the electronic device 201 at the time when the external electronic device 202 enters the sleep mode and/or the information on the tilting of the electronic device 201 at the time when the external electronic device 202 releases the sleep mode, and thereby the processor 250 obtains information about the movement (motion) of the electronic device 201.

In operation 925, the processor 250 determines whether the predicted location of the external electronic device is included in the field of view of the camera. The processor 250 displays a graphic object at the location of the external electronic device 202 predicted in operation 929 when the predicted location of the external electronic device 250 is within an area for the field of view of the camera 240. The processor 250 displays a graphic object for guiding the predicted location in operation 927 when the predicted location of the external electronic device is outside the area of the field of view of the camera 240. The graphic object is not a graphic object corresponding to the external electronic device 202. For example, the graphic object includes an arrow-shaped image. For another example, the graphic object includes an image identical or similar to the shape of the external electronic device 202.

Figure 10:
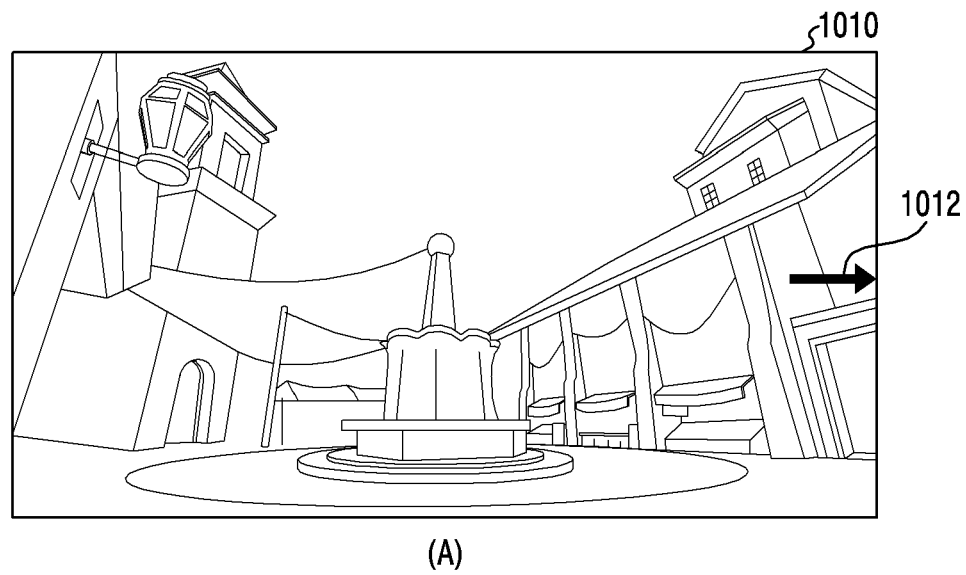
FIG. 10 illustrates an example of a graphic object for guiding a location of an external electronic device displayed on a display of an electronic device according to various embodiments.
Figure 10:
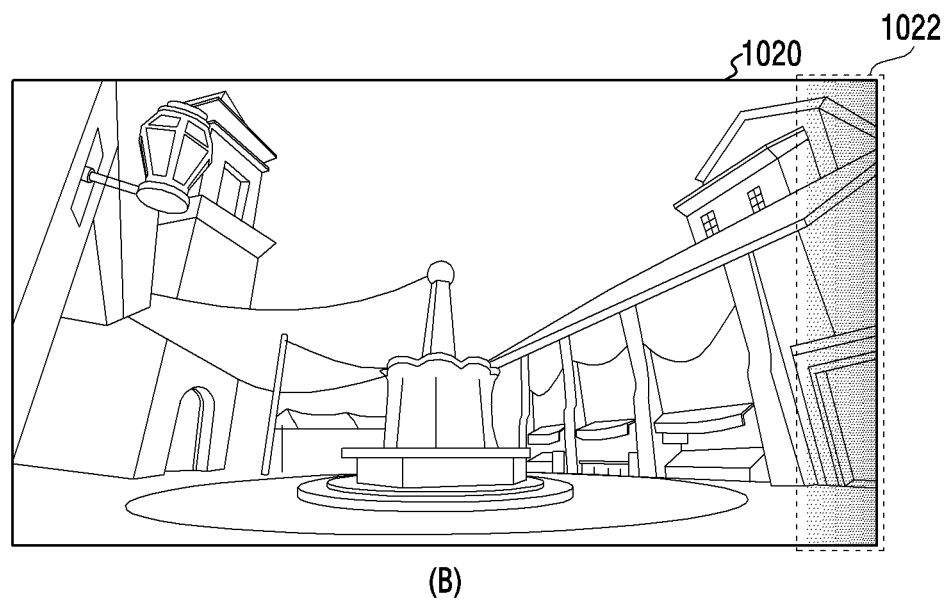

FIG. 10 illustrates an example of a graphic object that guides the location of an external electronic device according to various embodiments. Hereinafter, the images 1010 and 1020 displayed on the display 230 include images corresponding to a user's field of view. In various embodiments, the field of view of the camera 240 is the same as the field of view of the images 1010 and 1020 displayed on the display 230. However, the field of view of the camera 240 is not limited thereto, and as illustrated in FIG. 4B, it is smaller or larger than the user's field of view.

Referring to FIG. 10, the processor 250 displays an image 1010 related to multimedia content on the display 230. The image 1010 related with the multimedia content includes at least one of omnidirectional images or 3D images. In various embodiments, the processor 250 displays a graphic object for guiding the location of the external electronic device 202. For example, the processor 250 displays a graphic object 1012 in the shape of an arrow. The arrow-shaped graphic object 1012 is displayed to be superimposed on an image related to the displayed multimedia content. According to an embodiment, the processor 250 changes the display of the arrow-shaped graphic object 1012. For example, when the external electronic device 202 moves away from the electronic device 201, the processor 250 reduces the thickness of the graphic object 1012 in the shape of an arrow. For another example, when the distance between the external electronic device 202 and the electronic device 201 decreases, the processor 250 increases the thickness of the graphic object 1012 in the form of an arrow. In another embodiment, the processor 250 changes the color of a graphic object. The processor 250 changes the color of the graphic object based on the color of multimedia content displayed on the display 230. For example, the processor 250 determines a display area of the graphic object 1012 in the shape of an arrow, and identifies some areas of an image related to multimedia content corresponding to the determined area. The processor 250, in order to improve the discrimination power for the graphic object 1012, identifies the color of the identified area, and displays the graphic object 1012 in the shape of an arrow with the complementary color of the identified color.

In various embodiments, the processor 250 displays a visual effect 1022. The processor 250 displays the image 1020 associated with the multimedia content on which the visual effect 1022 is superimposed. For example, the processor 250 displays the visual effect 1022 in a boundary surface of a direction to which the external electronic device 202 is predicted to be located among the four boundary surfaces making the boundary of the display 230. The visual effect 1022 includes an effect of highlighting the boundary surface. Although not shown, the processor 250 includes a visual effect related to blur for blurring the boundary surface. In the above-described embodiment, the graphic object 1012 has been described as including an arrow-shaped image, but is not limited thereto. For example, the graphic object 1012 includes an image of the same shape with or similar shape to the external electronic device 202.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
one or more cameras having a designated field of view;
a display;
a communication circuitry; and
a processor,
wherein the processor is configured to:
identify an external electronic device among one or more external objects included in the designated field of view using the one or more cameras,
based on first location information of the external electronic device identified based at least on image information obtained using the one or more cameras, display a graphic object corresponding to the external electronic device on the display, and
when the external electronic device is out of the designated field of view, display the graphic object on the display based on second location information of the external electronic device identified using the one or more cameras before the external electronic device is out of the designated field of view and information related to a movement of the external electronic device received from the external electronic device via the communication circuitry after the external electronic device is out of the designated field of view.

2. The electronic device according to claim 1, wherein:
the external electronic device further comprises a first sensor comprising a gyro sensor; and a second sensor including an acceleration sensor, and
the information related to the movement of the external electronic device comprise at least one of data related to a tilt of the external electronic device obtained by the first sensor or data related to a speed change of the external electronic device obtained by the second sensor.

3. The electronic device according to claim 1, wherein:
the external electronic device further comprises a light emitting part including one or more light emitting diode (LED), and
the processor is configured to acquire an image including at least a portion of the light emitting part using the one or more cameras, estimate a location related to the light emitting part based at least on an image calculation for the image, and determine the first location information related to the external electronic device based at least on the estimated location.

4. The electronic device according to claim 2, wherein the processor is further configured to:
when the external electronic device is located within the designated field of view, identify a display location of the graphic object based at least on the first location information and the data related to the tilt of the external electronic device,
when the external electronic device is out of the designated field of view, identify the display location of the graphic object based at least on the second location information and third location information, and
display the graphic object based on the identified display location, and
wherein the third location information includes vector information obtained based on the data related to the tilt of the external electronic device and the data related to the speed change of the external electronic device.

5. The electronic device according to claim 1, wherein the processor is configured to display the graphic object based on multimedia content related to virtual reality, the first location information, and the second location information provided by the electronic device.

6. The electronic device according to claim 1, wherein the processor is configured to:
if the external electronic device is not identified within the designated field of view, receive, from the external electronic device, one or more third location information acquired during a designated time range before the external electronic device enters a low power mode, and determine a display location of the graphic object to be displayed on the display based at least on the one or more third location information when a display request of the graphic object is confirmed.

7. The electronic device according to claim 1, wherein the processor is configured to:
identify that the external electronic device has entered a sleep mode,
receive third location information of the external electronic device corresponding to an entry time point of the sleep mode and information related to tilting of the external electronic device corresponding to the entry time point,
identify that the sleep mode is released,
receive information related to the tilting of the external electronic device corresponding to a release time point of the sleep mode, and
display a second graphic object for indicating a location of the external electronic device based at least on the third location information of the external electronic device and information related to the tilting of the external electronic device corresponding to the entry time point, and information related to the tilting of the external electronic device corresponding to the release time point.

8. The electronic device according to claim 7, wherein the second graphic object includes an image of a same or similar shape with the external electronic device or an image of an arrow shape.

9. A method of an electronic device, comprising:
identifying an external electronic device among one or more external objects included in a designated field of view using one or more cameras having the designated field of view;
displaying a graphic object corresponding to the external electronic device on a display based on first location information of the external electronic device identified based at least on image information obtained through the one or more cameras; and
when the external electronic device is out of the designated field of view, displaying the graphic object on the display based on second location information of the external electronic device identified using the one or more cameras before the external electronic device is out of the designated field of view and information related to a movement of the external electronic device received from the external electronic device via a communication circuitry after the external electronic device is out of the designated field of view.

10. The method according to claim 9, wherein the information related to the movement of the external electronic device includes at least one of data related to a tilt of the external electronic device obtained by a first sensor included in the external electronic device, or data related with a change in speed of the external electronic device obtained by a second sensor included in the external electronic device.

11. The method according to claim 10, further comprising:
when the external electronic device is located within the designated field of view, identifying a display location of the graphic object based at least on the first location information and the data related to the tilt of the external electronic device;
when the external electronic device is out of the designated field of view, identifying the display location of the graphic object based at least on the second location information and third location information; and
based on the identified display location, displaying the graphic object,
wherein the third location information includes vector information obtained based on the data related to the tilt of the external electronic device and the data related to the change in speed of the external electronic device.

12. The method according to claim 9, further comprising:
obtaining an image including at least a portion of a light emitting part included in the external electronic device using the one or more cameras;
estimating a location related to the light emitting part based at least on an image operation on the image; and
determining the first location information related to the external electronic device based at least on the estimated location.

13. The method according to claim 9, wherein the displaying the graphic object on the display includes displaying the graphic object based on multimedia content related to virtual reality, the first location information, and the second location information.

14. The method according to claim 9, further comprising:
when the external electronic device is not identified within the designated field of view, receiving one or more third location information, from the external electronic device, acquired during a designated time range before the external electronic device enters a low power mode; and
when a display request of the graphic object is confirmed, determining a display location of the graphic object to be displayed on the display based at least on the one or more third location information.

15. The method according to claim 9, further comprising:
identifying that the external electronic device has entered a sleep mode;
receiving third location information of the external electronic device corresponding to an entry time point of the sleep mode and information related to tilting of the external electronic device corresponding to the entry time point;
identifying that the sleep mode has been released;
receiving information related to tilting of the external electronic device corresponding to a release time point of the sleep mode; and
displaying a second graphic object for indicating a location of the external electronic device at least based on the third location information of the external electronic device and information related to the tilting of the external electronic device corresponding to the entry time point, and information related to the tilting of the external electronic device corresponding to the release time point.

16. An electronic device, comprising:
a housing;
a memory;
a camera having a designated field of view and visually exposed through at least a portion of a first surface of the housing;
a display exposed through at least a portion of a second surface, of the housing, different from the first surface;
a communication module; and
a processor, wherein the processor is configured to:
- obtain information related to a location of an external electronic device interlocked with the electronic device using the camera,
- receive information related to tilting of the external electronic device from the external electronic device using the communication module,
- identify a graphic object based on at least one of the information related to the location or the information related to tilting,
- provide the graphic object for representing the external electronic device with multimedia content related to virtual reality using the display,
- identify that the external electronic device deviates from the designated field of view of the camera using the camera,
- in response to identifying a deviation, transmit a signal for requesting the external electronic device to transmit information related to a change in the location of the external electronic device, and
- change a displaying of the graphic object based on at least one of the information related to the location of the external electronic device at a deviation time obtained using the camera, the information related to tilting of the external electronic device, or the information related to the change in the location of the external electronic device.

17. The electronic device according to claim 16, wherein:
the information related to the change in the location of the external electronic device is determined based on data obtained by a sensor included in the external electronic device, and
the sensor includes at least one of an acceleration sensor or a gyro sensor.

18. The electronic device according to claim 16, wherein the processor is configured to activate an acceleration sensor in response to identifying that the external electronic device deviates from the designated field of view of the camera.

19. The electronic device according to claim 16, wherein the processor is configured to obtain a location to which the external electronic device is predicted to have moved based at least on the information related to the location of the external electronic device at the deviation time, the information related to tilting of the external electronic device, and the information related to the change in the location of the external electronic device.

20. The electronic device according to claim 16, wherein:
the graphic object is displayed superimposed on the multimedia content related to the virtual reality, and
the multimedia content includes content for providing virtual reality service.

* * * * *